US008298411B2

(12) United States Patent
Roberts et al.

(10) Patent No.: US 8,298,411 B2
(45) Date of Patent: Oct. 30, 2012

(54) SYSTEM AND METHOD FOR REDUCING POLLUTION IN A BODY OF WATER

(75) Inventors: Ricky Eugene Roberts, Greeley, CO (US); James Rhrodrick Key, Grove, OK (US); Griscom Bettle, III, Sarasota, FL (US)

(73) Assignee: Absolute Aeration, Greeley, CO (US)

( * ) Notice: Subject to any disclaimer, the term of this patent is extended or adjusted under 35 U.S.C. 154(b) by 460 days.

(21) Appl. No.: 12/486,544

(22) Filed: Jun. 17, 2009

(65) Prior Publication Data
US 2010/0096324 A1 Apr. 22, 2010

Related U.S. Application Data

(60) Provisional application No. 61/196,558, filed on Oct. 20, 2008, provisional application No. 61/199,820, filed on Nov. 20, 2008.

(51) Int. Cl.
*C02F 3/00* (2006.01)
(52) U.S. Cl. ........... 210/170.09; 210/170.1; 210/170.11; 210/620; 210/629; 210/748.03
(58) Field of Classification Search ............ 210/170.09–170.11, 620, 629, 748.03
See application file for complete search history.

(56) References Cited

U.S. PATENT DOCUMENTS

| 3,470,091 | A | * | 9/1969 | Budd et al. ................... 261/36.1 |
| 3,505,213 | A | * | 4/1970 | Fulton et al. .................. 210/614 |
| 3,850,807 | A | * | 11/1974 | Jones ........................ 210/170.05 |
| 3,855,367 | A | * | 12/1974 | Webb .............................. 261/77 |
| 4,039,439 | A | * | 8/1977 | Clark ............................ 210/629 |
| 4,911,849 | A | * | 3/1990 | Labesque et al. ............... 405/74 |
| 5,862,435 | A | * | 1/1999 | Suzumi et al. ................. 399/68 |
| 6,258,274 | B1 | * | 7/2001 | Wu .............................. 210/622 |
| 6,348,639 | B1 | * | 2/2002 | Crawford et al. ........... 435/262.5 |
| 6,802,978 | B2 | * | 10/2004 | Gomes de Oliveira et al. ......................... 210/703 |
| 7,001,516 | B1 | * | 2/2006 | Hong et al. .................. 210/260 |
| 7,087,173 | B2 | * | 8/2006 | Cote et al. .................... 210/650 |
| 7,323,107 | B2 | * | 1/2008 | Ames et al. .................. 210/602 |
| 2007/0039878 | A1 | * | 2/2007 | Roberts et al. ................ 210/605 |
| 2008/0112820 | A1 | * | 5/2008 | Tormaschy et al. ............ 417/61 |

FOREIGN PATENT DOCUMENTS

| JP | 7275893 | 10/1995 |
| WO | WO 2004/061242 A2 | 7/2004 |
| WO | WO 2006/130853 A2 | 12/2006 |

OTHER PUBLICATIONS

International Search Report in corresponding PCT Application No. PCT/US2009/047621 dated Feb. 2, 2010.

* cited by examiner

*Primary Examiner* — Chester Barry
(74) *Attorney, Agent, or Firm* — Scully, Scott, Murphy & Presser, P.C.

(57) ABSTRACT

A system and method reducing pollution in a body of water using biological processes is provided. The system includes a hydraulic dam generated by an induced downwelling of effluent water from a plurality of water circulating devices. A series of linearly arranged treatment sub-systems are disposed upstream of the hydraulic dam. The treatment sub-systems include a water sterilization sub-system for neutralizing harmful and undesirable micro-organisms using an ultrasonic energy generating unit. The ultrasonic energy generated, is of a frequency that disrupts cellular structures in targeted micro-organisms.

49 Claims, 18 Drawing Sheets

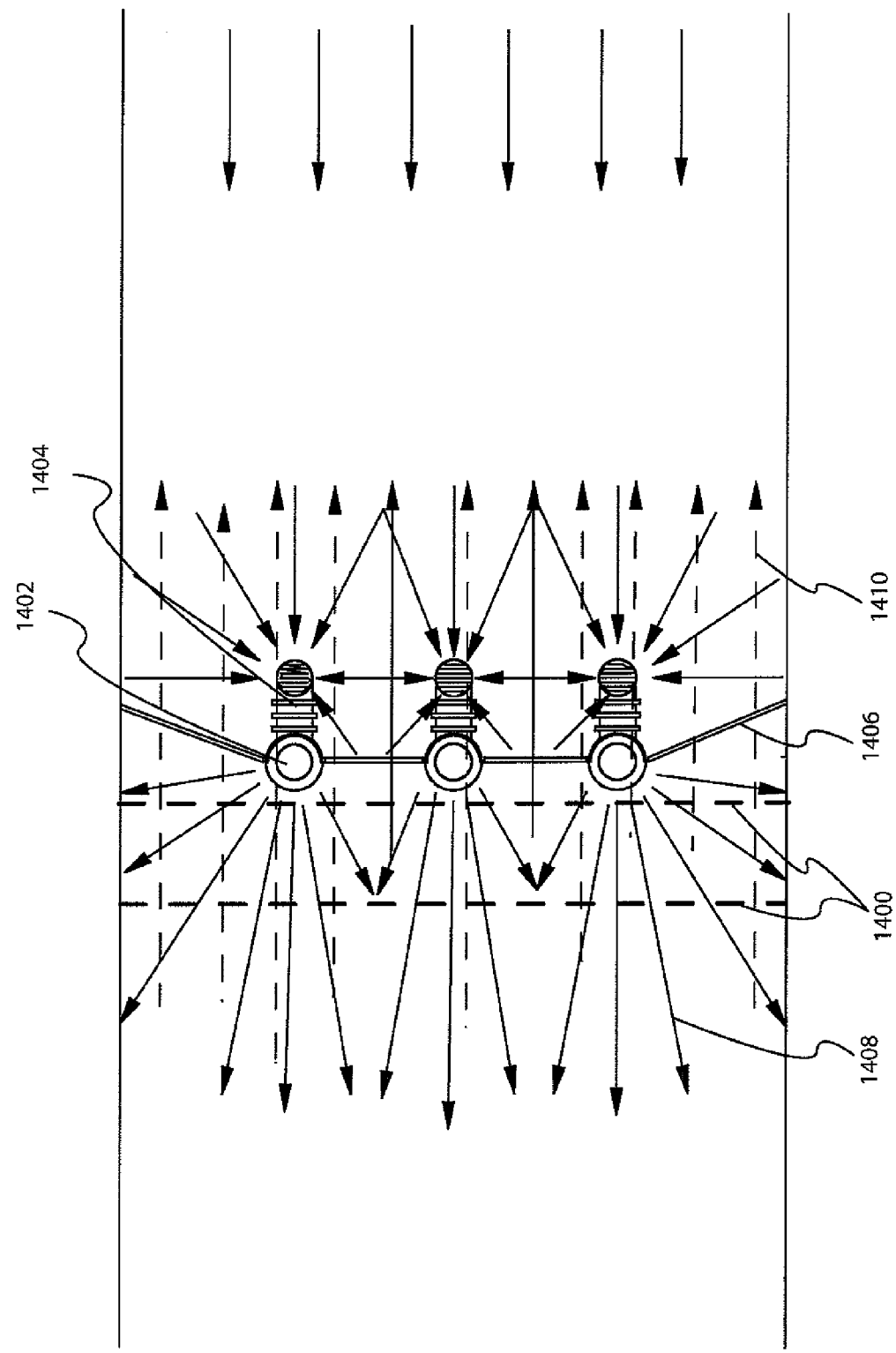

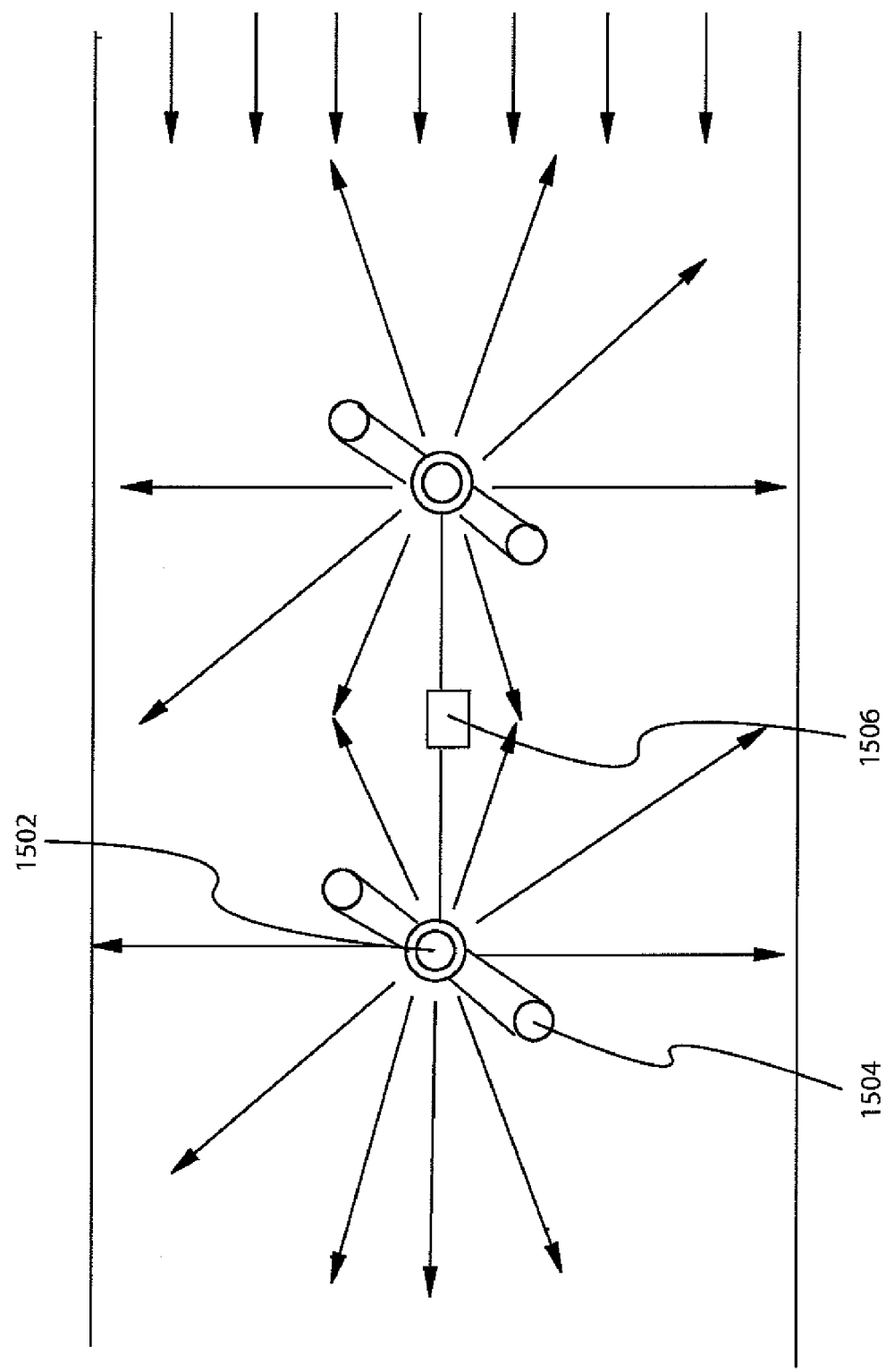

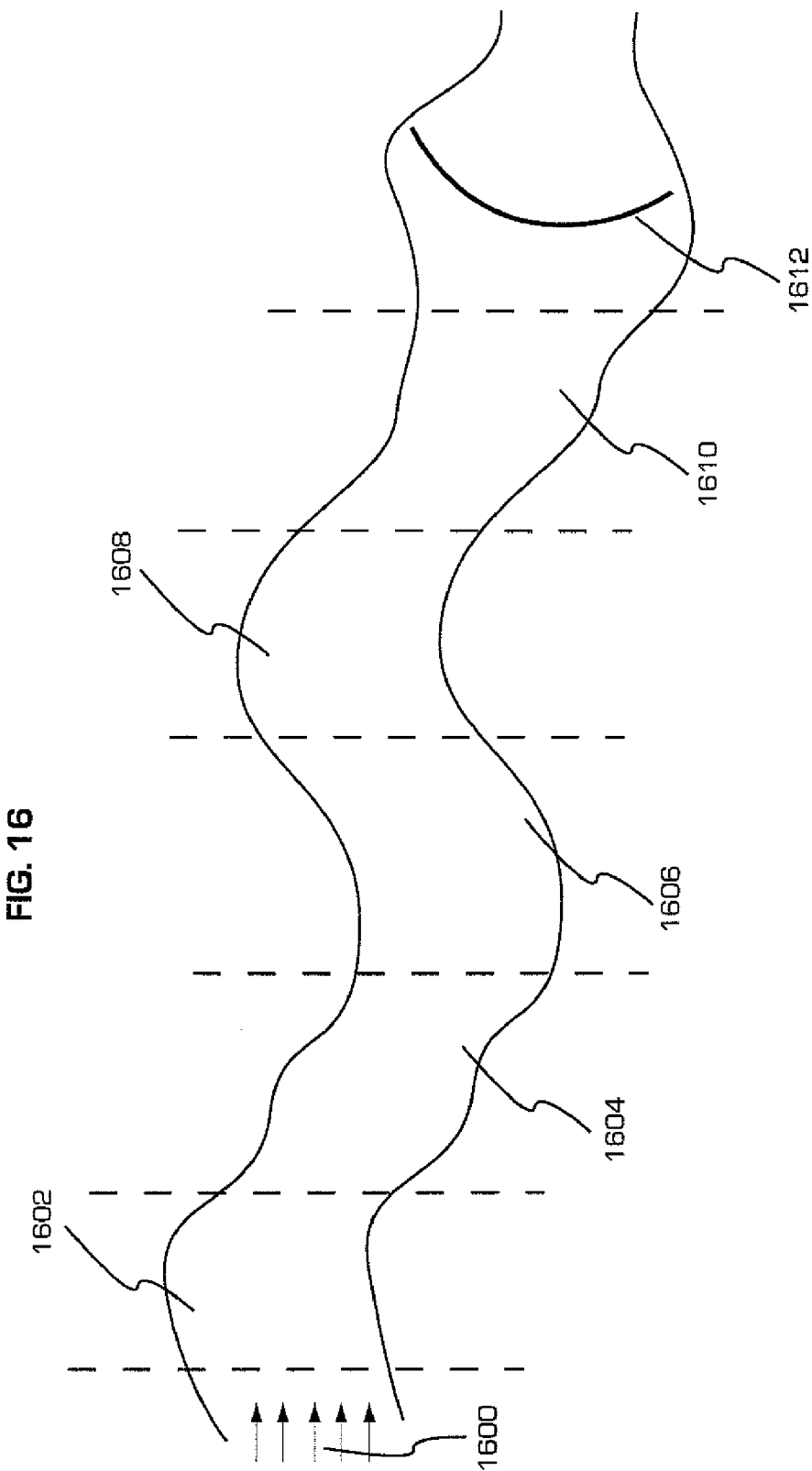

SYSTEM AND METHOD FOR REDUCING POLLUTION IN A BODY OF WATER

CROSS-REFERENCE TO RELATED APPLICATIONS

The present application claims benefit of U.S. Provisional Application No. 61/196,558 filed on Oct. 20, 2008, and U.S. Provisional Application No. 61/199,820 filed on Oct. 20, 2008. The subject matter of the identified provisional applications is incorporated herein by reference.

FIELD OF THE INVENTION

The present invention relates generally to treatment of polluted bodies of water More specifically, the present invention relates to a method for enhancing biological processes for breaking down organic matter in a body of water.

BACKGROUND OF THE DISCLOSURE

Bodies of water, such as lakes and rivers have been used by humanity for thousands of years for removing organic waste from populated areas. Generally, large bodies of water provide a large capacity for breaking down organic waste products through biological processes. However, as population growth near rivers and lakes increase, the influx of organic waste into these bodies of water soon overwhelms the water's natural capacity for efficiently processing the waste.

While providing waste removal for a community, nearby bodies of water are also utilized for drinking water and food. Thus, as the water becomes overwhelmed by the pollution introduced therein, the risk of water-borne diseases and parasites greatly increases as well.

SUMMARY OF THE DISCLOSURE

An embodiment of the present invention for reducing organic waste in a body of water includes a system having a damming sub-system having a plurality of circulators for generating a hydraulic dam across a selected location on a moving body of water; and a plurality of treatment sub-systems linearly disposed upstream of and in fluid communication with the damming sub-system. Each of the plurality of treatment sub-systems has one or more circulators, aerators or sterilizers. The hydraulic dam is formed by water flow back pressure exerted by downstream water flow resistance to outflow water from the circulators forming the hydraulic dam.

The treatment sub-systems include at least one of the following: a circulation sub-system having a plurality of water circulators configured for mixing water of a water column of a section of the body of water being treated; an aeration sub-system having a plurality of aerators for oxygenating the water to a desired dissolved oxygen level; a nutrient reduction sub-system having a plurality of aerators, each aerator disposed with a plurality of bio-mats anchored at one end to a side of each aerator and free-floating near the water surface, the bio-mats having a large surface area to weight ratio adapted for facilitating aerobic bacteria colonization of the bio-mats; an oxidation/sedimentation sub-system having a plurality of aerators configured for generating microbubbles for reducing a specific gravity of the water; and a sterilization and polishing sub-system having a plurality of sterilizers fitted with ultrasonic horns for generating ultrasonic energy at selected frequencies capable of killing microbes present in the body of water.

In addition, an embodiment of the present invention includes a final clarification sub-system disposed at a downstream location upstream from the damming sub-system. The final clarification sub-system has a plurality of aerators equipped with a double-J water inlet. The final clarification sub-system reduces the specific gravity of the water allowing fine suspended matter to sediment out of a water column of the body of water.

Another embodiment of the present invention includes a selection sub-system for selecting sludge-liquefaction organisms and selecting against malodor-producing organisms; and a plurality of subsequent treatment sub-systems linearly disposed downstream of and in fluid communication with the selection sub-system, each of the plurality of treatment sub-systems having one or more circulators, aerators or sterilizers.

Additionally, a sterilizing water circulation apparatus of the present invention includes an upper float chassis with a wider lower base thereof being equipped with an annular water outflow lip at essentially the surface level of the water; a sectional diverter for water being arranged in a lower portion of the upper float chassis, the sectional diverter facilitating a generally horizontal laminar outward flow through the spacing along the surface of the water in which the sterilizing water circulation apparatus floats; motor-driven means being mounted on the upper float chassis connected to a rotatable screw drawing water into a lower open end of the circulator device effectuating a flow of the water towards the spacing between the bottom lip and the upper end of the diverter, the screw being adapted to minimize bubble formation in the outward flow; and a sterilizing unit disposed in fluid communication with the water, the sterilizing unit emitting energies tuned to disrupt cellular structures of micro-organisms. In one embodiment, the sterilizing unit is an ultrasonic energy generating device mounted on an external surface of the sterilizing water circulation apparatus. Alternatively, the sterilizing unit is an ionizing energy generating device mounted on an internal surface of the sterilizing water circulation apparatus and is in fluid communication with an internal fluid flow generated by the motor-driven means.

A hydraulic drain generating apparatus of the present invention includes an upper float chassis with a lower wider base thereof being equipped with an annular water outflow lip at essentially the surface level of the water; a sectional diverter for water being arranged in a lower portion of the upper float chassis, the sectional diverter facilitating a generally horizontal laminar outward flow through the spacing along the surface of the water in which the hydraulic dam generating apparatus floats; motor-driven means being mounted on the upper float chassis for drawing water into a lower open end of the circulator device effectuating a flow of the water towards the spacing between the bottom lip and the upper end of the diverter; an inlet tube disposed at the lower open end of the circulator device, the inlet tube being configured for drawing water from within 2 feet of the surface level of the water on an upstream side; and a deflecting member for directing the outward flow of the water towards a generally downstream direction. The directed outward flow of water generates a downwelling water layer for inhibiting downstream flow of subsurface water.

To generate a hydraulic dam, a plurality of hydraulic dam generating apparatus is disposed in a line across a section of a fluid path of the water and orthogonal to the direction of a flow of the water.

Yet another embodiment of the present invention includes a surface circulating apparatus. The surface circulating apparatus comprises an upper float chassis with a lower wider base thereof being equipped with an annular water outflow lip at essentially the surface level of the water; a sectional diverter for water being arranged in a lower portion of the upper float chassis, the sectional diverter facilitating a generally horizontal laminar outward flow through the spacing along the surface of the water; motor-driven means being mounted on the upper float chassis for drawing water into a lower open end of the circulator device effectuating a flow of the water towards the spacing between the bottom lip and the upper end of the diverter; and an inlet tube disposed at the lower open end of the circulator device, the inlet tube being configured for drawing water from within 2 feet of the surface level of the water.

The inlet tube is formed with a single inlet opening and is generally J-shape. Alternatively, the inlet tube is formed with a two inlet openings and generally double J-shape. Each of the inlet openings, of the generally double-J shaped inlet tube, is situated at opposite sides of the surface circulating apparatus. The mouth of both of the J-shaped tubes is typically sealed to prevent vortex formation and inlet means are installed perpendicular to the "J". Thus preferred flow is horizontal and perpendicular to the J-shaped tubes. The centerline of the horizontal inlet means is at least 6 inches below the water surface.

Yet another embodiment of the present invention is a wave generating system. The wave generating system includes a fluid circulating apparatus having an upper float chassis with a lower base thereof being equipped with an annular water outflow lip at essentially the surface level of the water, a sectional diverter for water being arranged in a lower portion of the upper float chassis, the sectional diverter facilitating a generally horizontal laminar outward flow through the spacing along the surface of the water in which the hydraulic dam generating apparatus floats, and motor-driven means being mounted on the upper float chassis for drawing water into a lower open end of the circulator device effectuating a flow of the water towards the spacing between the bottom lip and the upper end of the diverter. Although it is not necessary as the lower base may be narrower or wider or the same size as the upper float chassis, in an embodiment, the base is wider.

In addition, a recessed portion situated at a bottom of a shallow pond is dimensioned to accommodate the fluid circulating apparatus at a top end of the recessed portion and limiting movement of the fluid circulating apparatus to a vertical direction. The recessed portion includes an inflow section running underneath a bottom surface of the shallow pond for drawing water from the shallow pond into the recessed portion. The inflow section directs the drawn water into the recessed portion at a tangential angle for inducing a centrifugal flow around the inside perimeter of the recessed portion.

Yet another embodiment of the present invention is a water aerating apparatus including an upper float chassis with a lower base, which in one embodiment is wider, but in other embodiments are the same size or narrower, the base being equipped with an annular water outflow lip at essentially the surface level of the water; a sectional diverter for water being arranged in a lower portion of the upper float chassis, the sectional diverter facilitating a generally horizontal laminar outward flow through the spacing along the surface of the water; motor-driven means being mounted on the upper float chassis for drawing water into a lower open end of the circulator device effectuating a flow of the water towards the spacing between the bottom lip and the upper end of the diverter; air injection means having a venturi assembly for injecting air into the water to generate fine microbubbles in the outward flow; and an inlet tube disposed at the lower open end of the circulator device, the inlet tube being configured for drawing water from within 2 feet of the surface level of the water.

BRIEF DESCRIPTION OF THE DRAWINGS

These and other features, aspects, and advantages of the present invention will become better understood with regard to the following description, appended claims, and accompanying drawings wherein:

FIG. 8-15 illustrates exemplar segments of an embodiment of a water treatment system in accordance with the present invention; and FIG. 16 illustrates an overview of a linearly disposed embodiment of a water treatment system in accordance with the present invention.

DETAILED DESCRIPTION OF DISCLOSURE

Figure 1:
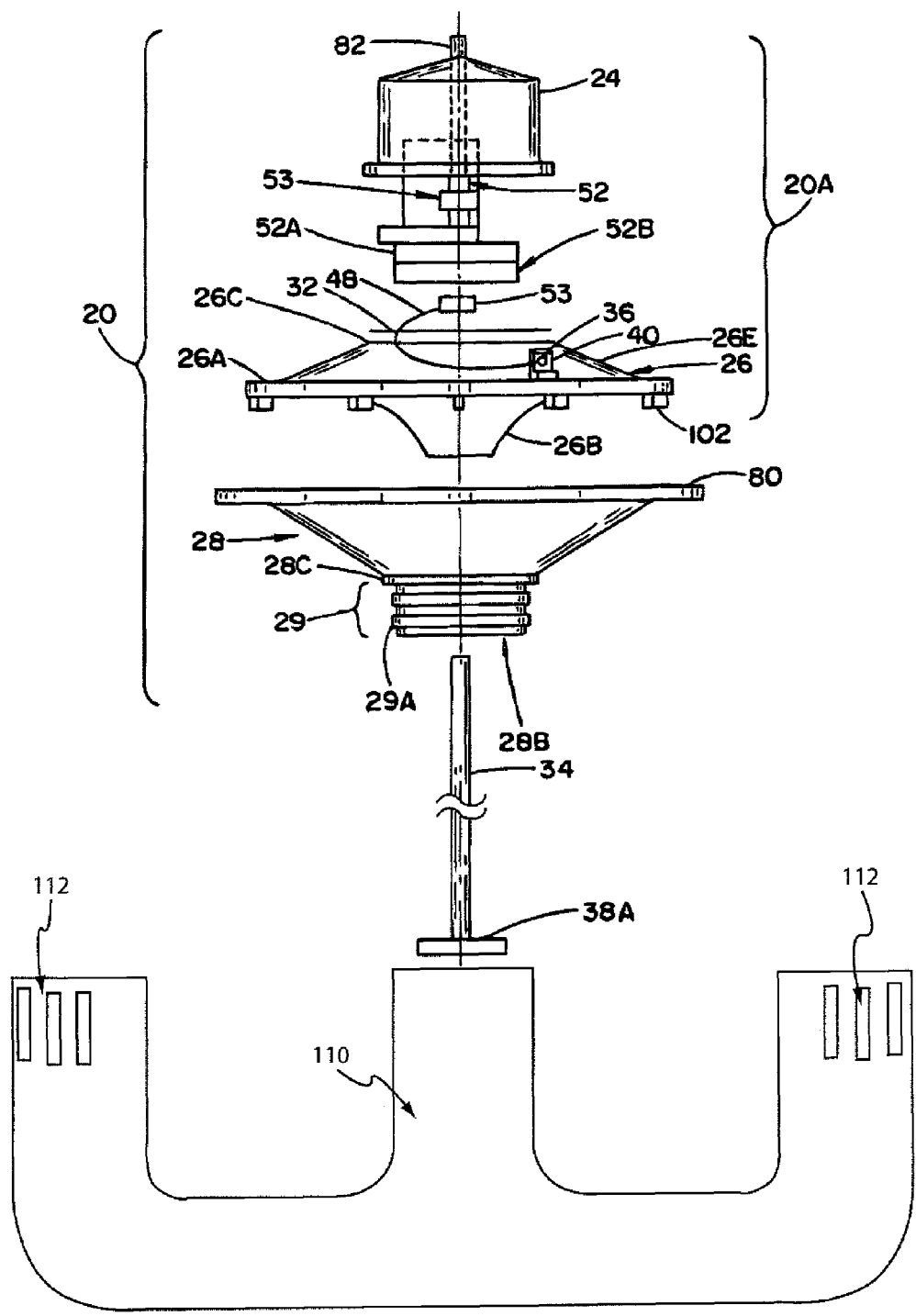
FIG. 1 illustrates an embodiment of a water circulating unit in an exploded view in accordance with the present invention.

The present invention utilizes, and in certain circumstances modifies, the water circulators disclosed in U.S. Pat. No. 7,329,351 (hereinafter, "'351 patent") issued to inventors in common with the present invention, and incorporated herein by reference. Specifically, three circulator types are contemplated for use in the present invention for increasing biological processes that break down organic waste in water. These circulators will be described herein. For clarity, identical elements in multiple figures are assigned the same reference numeral.

Circulator

The basic water circulating unit (referred to herein as "circulator") utilized in the present invention is described below. It may have certain similarities to the circulator disclosed in the '351 patent. However, the present circulator differs, in many respects, from the '351 circulator, e.g., the intake tubes of the circulators described hereinbelow are configured to suction water nearer to the surface than the circulators defined in the '351 patent, which is discussed in more detail below.

FIG. 1, an exploded view of circulator 20, illustrates most of the unit's components and their interaction. Diverter 28, the lower portion of the unit, includes an inverted frusto-conical shell of substantially circular cross section and substantially straight sides. It has a protruding edge around its upper periphery, outflow 80, which serves to guide water discharged from circulator 20 into laminar flow along the water surface. The lower, narrowest portion of the diverter has a collar 28C, below which is located a substantially cylindrical standard connection fitting 29, including concentric ridges 29A. Diverter intake 28B is located inside connection fitting 29. These components are discussed in detail below. Drive shaft 34 extends through diverter intake 28B and mounts at its lower end an impeller hub mount 38A to which is removably attached the impeller and a plurality of blades (not shown here). Drive shaft 34 is made of stainless steel or a similar strong, corrosion-resistant alloy, and is about 1½ inches in diameter in a present embodiment. Optionally, impeller 38A can be a helical screw.

Mounted above the diverter 28 is the circulator upper assembly 20A, with a float chassis 26, first including an upper frusto-conical shell 26E connected to a flat circumferential rim 26A, and mounting plate 32 mechanically attached to top surface 26C of float chassis 26 for use in mounting internal components discussed below. The float chassis 26 has a wider lower base portion formed by the base of the frusto-conical shell 26E and flat circumferential rim 26A. This wider base provides stability of the circulator in the water as well as accommodating the shape of the sectional diverter 26B attached to the lower portion of float chassis 26.

When the lower base portion and the upper lip are the same diameter, the radially out-flowing water is formed into a wall which gravity can pull down and not radially. When the lower base portion has a diameter greater than the upper lip, the water profile is triangular. By the time the flow reaches the end of the lower base portion, there is a substantial horizontal vector and flow is radial away from the circulator.

The sectional diverter 26B resembles an inverted frustum of a cone with substantially parabolically curved sides inside and out. The upper edge of sectional diverter 26B connects to the bottom of float chassis rim 26A A plurality of supports 102 are integrally attached to the bottom of rim 26A to separate it from the outflow lip 80 when the float chassis 26 and diverter 28 are joined with mechanical connectors, as described below.

When assembled, the circulator 20 includes a motor cover 24 to protect the electric motor and other components, this cover being removably attached mechanically to the top of float-chassis 26. A lifting rod 82 is attached to the unit to facilitate moving the assembled unit. Lubrication for the rotating parts is provided by a Petromatic™ grease cup 40 held by grease cup holder 36 fastened atop the outer rim 26A of float chassis 26, with a grease line 48 directing grease to bearing 53. An electric motor 52 is mounted on motor mounts 52B and connects to gear reducer 52A to drive the impeller attached to the impeller hub 38A at a suitable speed via drive shaft 34.

Figure 1A:
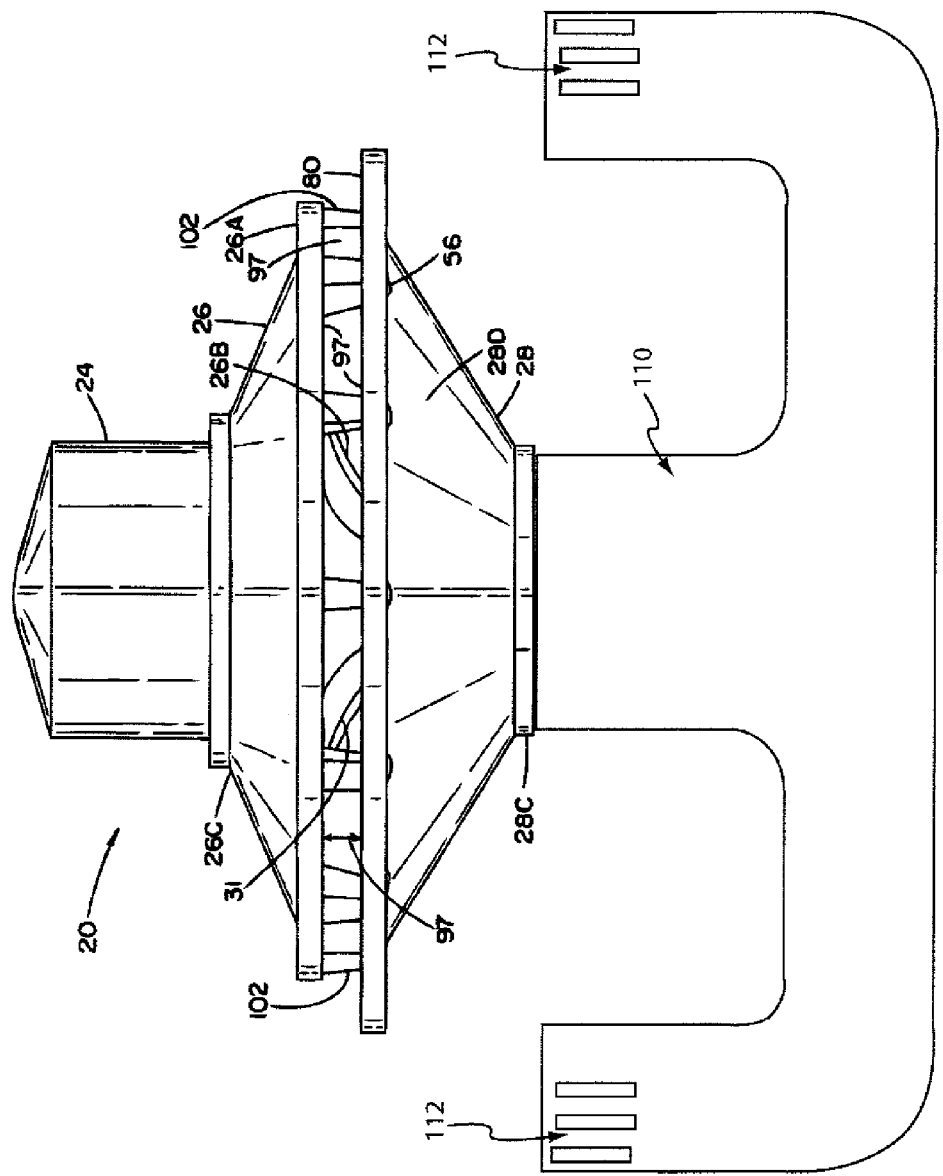
FIG. 1a illustrates an assembled view of the water circulating unit of FIG. 1.

FIG. 1a provides a detailed view of the assembled circulator 20, including motor cover 24, float chassis 26 and diverter 28. Cover 24 is removably mechanically connected to the upper surface 26C of float chassis 26. Supports 102 are preferably molded as integral parts of the underside of rim 26A of float chassis 26, but can optionally be fabricated separately and attached by any suitable mechanical means. Float chassis 26 and diverter 28 are mechanically connected by bolts 56 or other suitable mechanical connectors passing through bolt holes from the underside of outflow lip 80 into the undersides of supports 102. Supports 102 are of a height appropriate to optimize the flow of water discharged through the outflow spaces 97 between the underside of rim 26A of float chassis 26 and outflow lip 80 of diverter 28, and are streamlined. In one embodiment, outflow lip 80 is about six inches wide.

The diverter intake 28B, within which the impeller operates, takes up water into a progressively expanding annular passage defined by the conical interior of diverter 28 and the parabolically curved exterior of the sectional diverter 26B. The intake water then emerges through outflow spaces 97 onto outflow lip 80 to flow in omni-directional laminar fashion onto the surface of the water in which the unit floats. The buoyancy of the circulator is designed so that it floats at a level such that water surface is above outflow lip 80, with water covering at least a portion of outflow spaces 97, and water surface lying at about the level of the underside of chassis lip 26A or lower. This produces a laminar flow of water initially having a height of about the height of outflow spaces 97.

The width of outflow lip 80 can be varied in different models to optimize the production of laminar flow for various volumes and rates of discharge. For example, a four-inch outflow space and six-inch outflow lip are effective in producing laminar flow for a discharge of about 7 million gallons/day (MG/D) using about two horsepower. When the unit is operating in aeration mode, the multiple plane surfaces of diverter 28 (28D) and the sectional diverter 26B (31), forming polygonal cross sections, are helpful in producing some bubbles in the water, which contribute to better mixing and aeration.

Connection fitting 29 below diverter collar 28C at the bottom of diverter 28 includes concentric ridges 29A and diverter inner surface inside (not shown in FIG. 1). Water can be taken up directly through diverter intake 28B or through an intake tube 110. Fitting 29 is designed to mate with a fitting for a corrugated intake tube.

The circulator 20 shown in FIGS. 1 and 1a differs from the circulator disclosed in the '351 patent by including an intake tube 110 that has a double J-shaped. The double J-shaped intake tube 110 allows the circulator 20 to circulate the surface layer of water. Generally, the intake openings 112 of the double J-shaped intake tube 110 are disposed on a side portion of each J of the double J-shaped intake tube 110 and at a position below the water surface, preferably slightly below the water surface. For example, in an embodiment the intake openings 112 are within about the top 3 to 15 inches of the water surface. The intake openings 112 are disposed at opposing sides of the circulator 20. Circulators 20 equipped with the double J-shaped intake tube 110 provide surface water mixing and wave formation. The circulators disclosed in the '351 patent provides mixing between surface and deeper water, which can increase dissolved oxygen (DO) at lower depths of a body of water.

Figure 2:
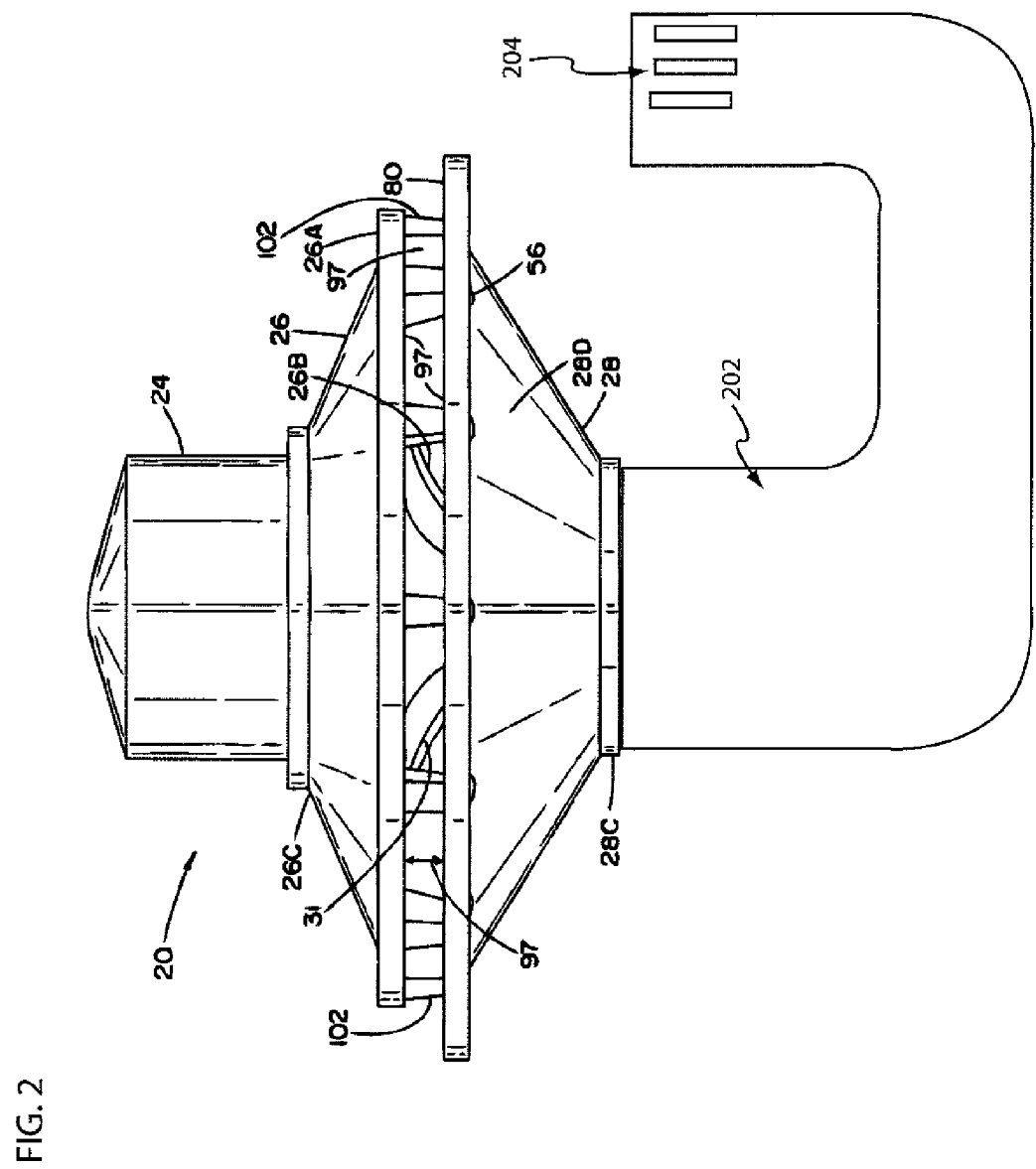
FIG. 2 illustrates a first modification of the water circulating unit shown in FIG. 1.

FIG. 2, is a modification of the circulator 20 shown in FIG. 1, and is identical to the circulator shown in FIGS. 1 and 1a except to the extent indicated below. The circulator 20 includes a single J-shaped intake tube 202 having a single set of intake openings 204. As with the double J-shaped intake tube 110 of FIG. 1, single set of intake openings 204 are disposed on a side portion of the J-shaped intake tube 202. The single J-shaped intake tube 202 provides surface water mixing and wave formation.

The '351 patent circulator inlet is placed as close to the surface as possible, but is still approximately 1½ pipe diameters below the water surface. A circulator of the present embodiment, however, with the double J-shaped intake tube 110, as shown in FIG. 1, raises the horizontal suction to about 3-15 inches from the surface because the top of tube 110 is closed off and horizontal inlet means are cut into the vertical sides of tube 110 from about 3 to about 15 inches below the water surface. This has the desirable effect of cutting the aerated water column by a factor of three. Using the double J circulator in the above-mentioned case increases the DO measured 6 inches below the surface from 0.14 mg/l to 2.0 mg/l in a winery wastewater treatment lagoon. In this application, the incoming BOD can be as high as 10,000 mg/l. The produced sludge from aerobic activity sinks during the day and floats at night. This anomaly occurs because the anaerobic sub-surface activity produces gas which occludes to the produced sludge and lifts it to the surface. When the sun comes out, the black sludge is heated and the gas is released. Thus an unwanted vertical sludge mixing occurs.

The change in suction concentrated the bubbles by a factor of three and the previously rising-then-sinking sludge sank in spite of the occluded gas. This stopped the vertical mixing and the DO rose in the regulated zone until the regulation limits were achieved. There was no change in horsepower, so unexpectedly, the surface DO rose with no additional energy input. It is typical in US practice to require a DO>1.0 mg/l in the top 12 inches of a lagoon water column.

Figure 3:
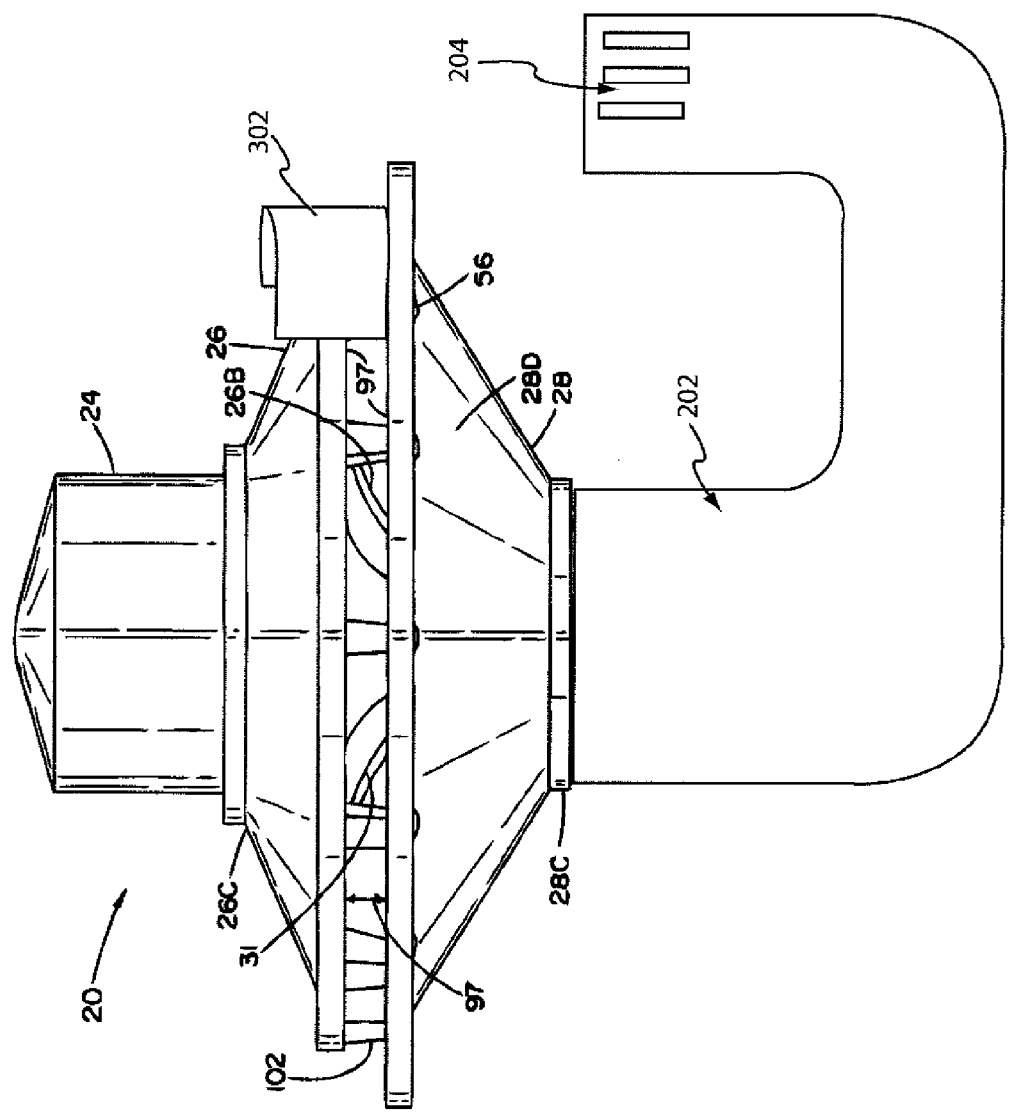
FIG. 3 illustrates a second modification of the water circulating unit shown in FIG. 1.

Yet another modification of a circulator is shown in FIG. 3. The circulator 20 shown in FIG. 3 is identical to the circulator 20 disclosed in FIG. 1, except to the extent indicated hereinbelow. The circulator 20 is equipped with a deflector member 302 disposed at a portion of the water outflow spaces 97. The deflector member 302 prevents water from out flowing at the portion of the water outflow spaces 97 blocked by the deflector member 302. Thus, water outflow can be limited to an arc of less than 360° depending on the extent of the water outflow spaces 97 that are blocked by the deflector member 302. Generally, when a circulator 20 is equipped with a deflector member 302, the circulator 20 is also configured with a single J-shaped intake tube 202. The intake of the single J-shaped intake tube 202 is directed to draw water from the side of the circulator 20 behind the deflector member 302.

The circulator 20 equipped with the deflector member 302 can be utilized for directing water flow in a particular direction or to create a hydraulic dam, as described in detail below.

Sterilizing Circulator

Figure 4:
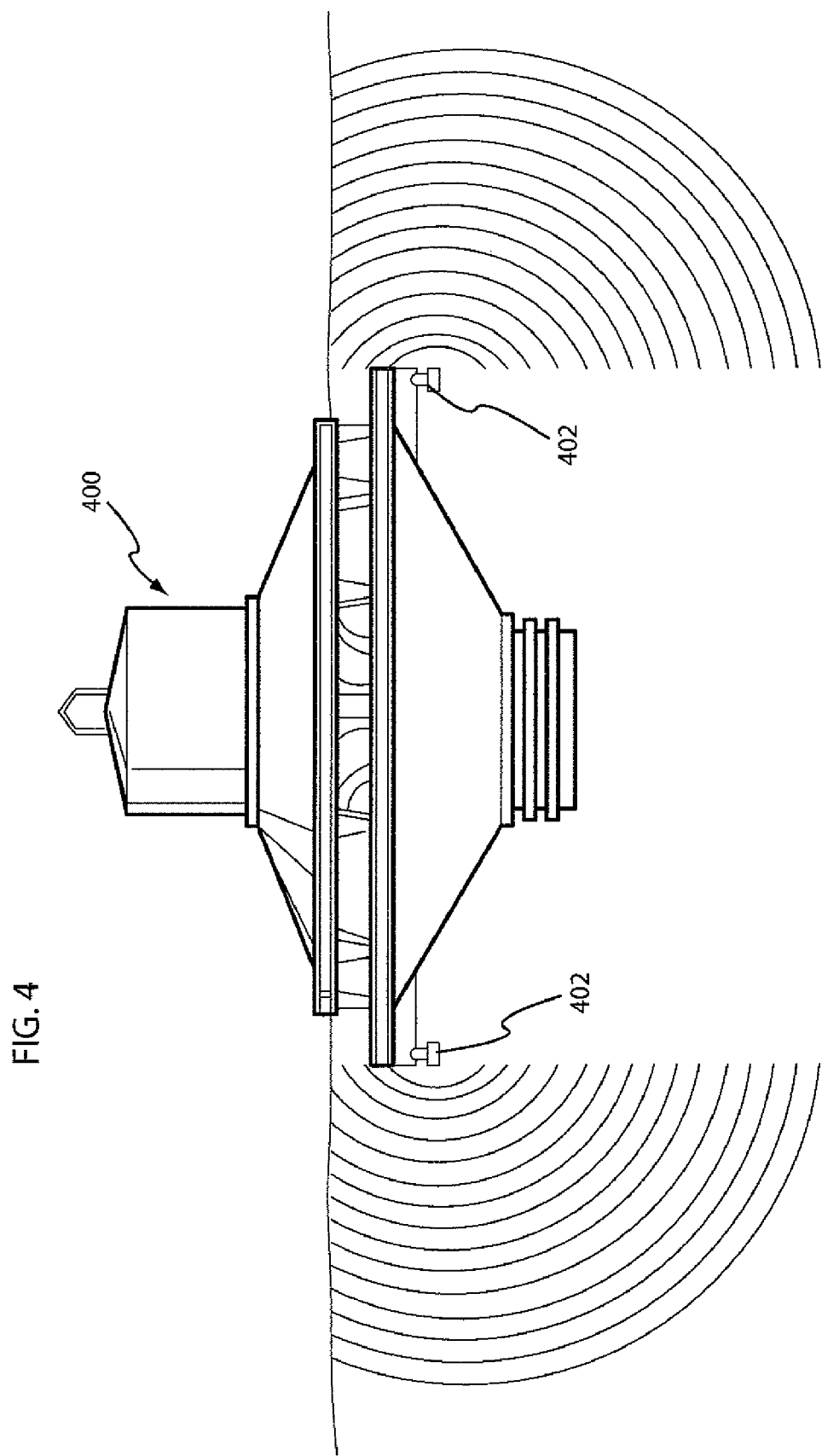
FIG. 4 illustrates an embodiment of a sterilizing circulator in accordance with the present invention.

A second circulator used in the present invention is shown in FIG. 4. The circulator 400 is similar to the circulator disclosed in the '351 patent. However, the circulator 400 includes a sterilizing unit 402 disposed on the circulator 400. The sterilizing unit 402 is an ultrasonic horn tuned to a plurality of frequencies that effectively kill microbial cells, such as water-borne pathogens and undesirable algae.

The effective frequency is not the same for all organisms. The inventive system is effective because it encourages bacterial growth, not kill it. There is a balance because some organisms are desirable and some, like pathogens and mal-odor-producing bacteria are unwanted. Particularly, algae are usually unwanted because they are measured as suspended solids, a regulated result The frequency range for algae is not disclosed in this specification, but those skilled in the art can determine a particular frequency without undue experimentation. Such ultrasonic horns are well known in the art. They are limited however because the energy discharge is focused over about a 30° cone, thus there are gaps in the coverage or interference between adjacent horns. In addition, the effectiveness is reduced by the square of the distance downstream of the horn. In this embodiment, the bacteria are circulated past the kill zone rather than emitting a declining kill zone out to the bacteria. Thus many more bacteria are exposed to the kill zone when a circulator is combined with an ultrasonic horn.

Alternatively, the sterilizing unit 402 emits ionizing radiation such as ultraviolet (UV) wavelengths selected for their lethality to water-borne pathogens and undesirable algae. In addition, the sterilizing unit 402 may be effective at dissociating certain chemical pollutants. This effect is especially obtained with UV and other ionizing radiation. In the art, sterilizing generally refers to a reduction in population of target organisms on the order of log-6. However, within the context of the present invention sterilizing refers to a greater than log-1 reduction in targeted microorganism population.

In an embodiment, the sterilizing unit 402 is an ultrasonic horn, as depicted in FIG. 4. The ultrasonic horn sterilizing unit 402 is preferably placed to propagate ultrasonic energy radially out from the circulator 400. The sterilizing unit 402 generates sufficiently powerful ultrasonic energy to destroy targeted microbes and algae within a diameter of at least 50 meters from the circulator 400, and up to about 600 meters, and beyond. When the sterilizing unit 402 contains one or more ultrasonic horns, the circulator 400 is modified to replace the impeller (not shown) used for generating the water suction with a screw. The purpose for the modification is to reduce the production of air bubbles in the outflow water. Air bubbles can prevent the ultrasonic energy from propagating through the water. Thus, by replacing the impeller with a screw an optimal benefit of the ultrasonic energy can be achieved. The screw also reduces the energy consumed by the circulator because energy-consuming turbulence is eliminated. In experiments comparing the screw to the impellor, the energy was reduced by 50% at the similar flow rates. The impellor had much more turbulence and eddies than the screw in the out-flowing water.

Traditional ultrasonic horns are well known for killing algae and microorganisms. But their efficacy is based on line of sight killing fixed by the angle of the horn. By combining the horn with surface recirculation, the efficacy is no longer line of sight but spreads through 360° because untreated water is recycled past the horn kill zone continuously until all microbes and algae pass through the killing zone.

Ultrasonic energy is the preferred sterilization means, because UV may cause damage to fish and other life in the river that are not generally affected by ultrasonic frequencies. Therefore if UV is used it should be confined to an area within the internal fluid path of the circulator 400, such that UV does not propagate to the water external of the circulator 400.

For example, in a major park in Mexico City there are two small ponds, forest green with accumulated algae. Poisoning the algae is not an option because tens of thousands of people paddle on the North pond every week. The algae are inherent to the pond because the urban environment continuously supplies the $CO_2$ used by the algae for their carbon source. The sterilizing circulator of the present embodiment solved this problem. Recirculation of water from the first pond to the second pond created flow. Strategic placement of the sterilizing circulators ensured that the water moved through the sterilization zone continuously. The algae died and there was visible color improvement in two weeks and clear surface water in a month.

Aerator/Circulator

Figure 5:
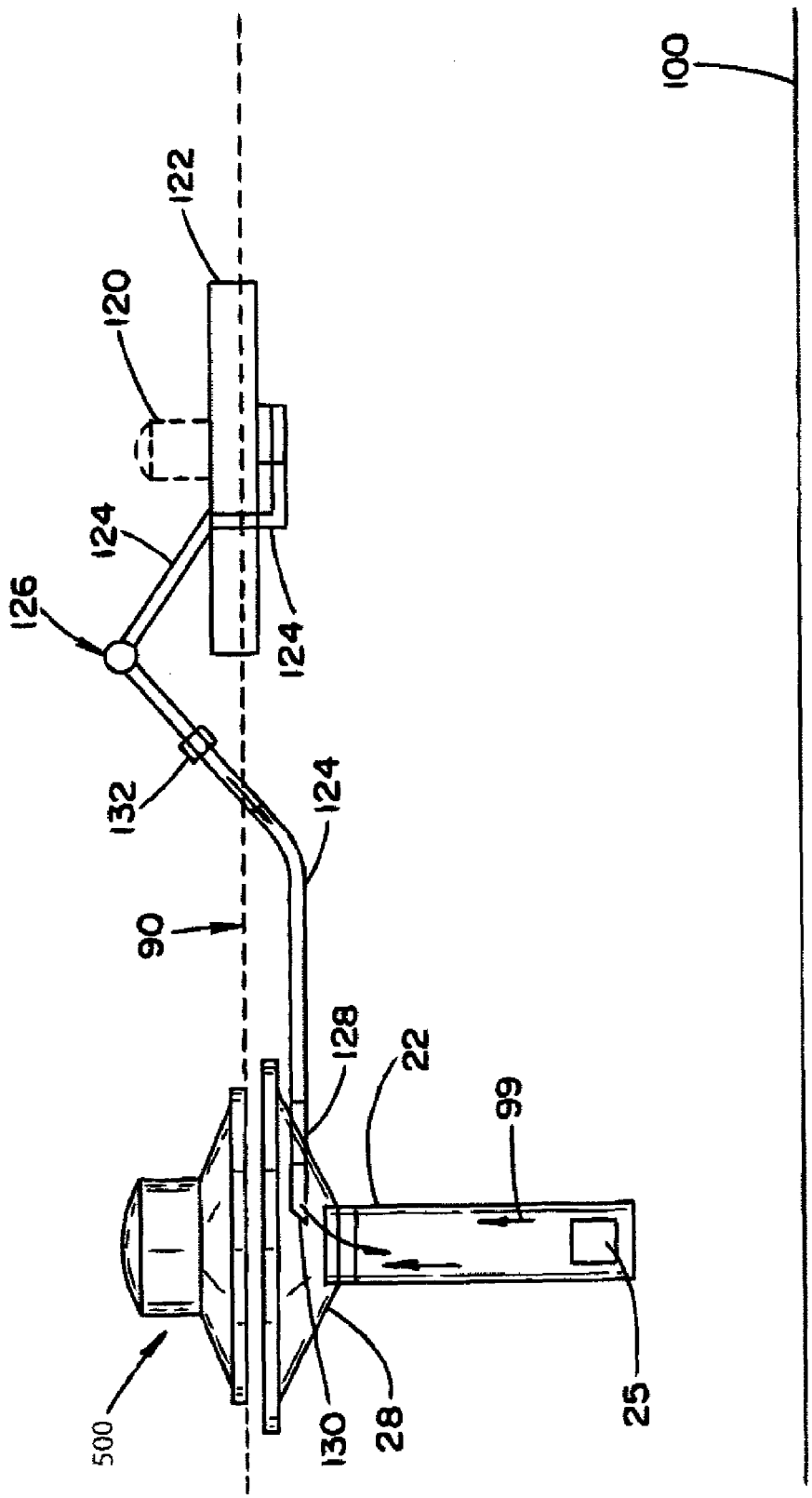
FIG. 5 illustrates an embodiment of an aerator/circulator in accordance with the present invention.

FIG. 5 illustrates a side view of another circulator system that is adapted for generating microbubbles. As shown, aerator 500 with intake tube 22 and horizontal intake ports 25 at the bottom is operating in mix mode, which would normally send water flowing over outflow lip in laminar flow. The bottom of the intake tube 22 is situated to not contact the bottom surface 100. The aeration process is supplemented by mounting an electrical pump or air blower 120 (shown schematically) on a flotation device 122 adjacent to aerator 500, connecting the pump or blower 120 to an appropriate type and size of line 124 to carry the outgoing water or air to a water-activated venturi 126. Such venturi apparatus can be obtained commercially from the Mazzei Venturi Corp. of Bakersfield, Calif. Lines 124 continue from venturi 126, via connections 132 as required, to aerator 500, where the diverter 28 is pierced by a flanged pipe 128. An elbow or deflector 130 is provided at the inner end of flanged pipe 128 to direct the flow of the water or air to mix with up flowing water 99 within intake tube 22 and outward across outflow lip 80, as indicated by arrows 99, and across the surface of the water 90. The result is to increase the dissolved oxygen content in the water to be treated.

It is emphasized that there is a difference between small bubbles and microbubbles. Small bubbles form when the circulator is operated in the aerate mode. The small bubbles cause water to flow upwards to the surface when the impeller rotates in the unilateral directions e.g., clockwise direction. However, when much smaller microbubbles are formed, for example, when streams from two venturis impinge into one another, the flow effect is opposite. Microbubbles in water form an intimately mixed gas-water fluid, which flows from the surface to the subsurface as would a single-phase fluid when the impeller rotates in the unilateral directions, e.g., counter-clockwise direction. Moreover, the small bubble-containing fluid provides a discontinuous stream whereas the microbubble-containing fluid acts as if it were a homogeneous stream. The gas/liquid-phase fluid acts like a liquid-only phase fluid because the drag on the microbubble is only slightly lower than the buoyancy of the bubble. Thus the upward and downward forces are substantially equal. Eddies from the out-flowing radial fluid re-mix the microbubbles and keep them suspended in the two-phase fluid, In this application the screw is more advantageous than the impellor. When the impellor creates turbulence in radially out-flowing water, microbubbles can be brought into contact with another microbubble. When this occurs, the two small bubbles become a single larger bubble and float out of the water column, raising the specific gravity. When the screw was used, the turbulence was reduced and the specific gravity measured 20 ft downstream of the circulator had a specific gravity of 0.96 versus 0.97 with the impellor. Though the difference seems small, skilled artisans will recognize that the Stokes Law solids settling velocity was increased 25%. Stokes Law states that the settling velocity is proportional to the difference in specific gravity between the solid and the liquid. Metcalf & Eddy state that the specific gravity of sludge is 1.01. The velocity increase is $(1.01-0.96)/(1.01-0.97)=1.25$. In the winery example with floating-then-sinking sludge, this increased settling velocity is significant.

Figure 5A:
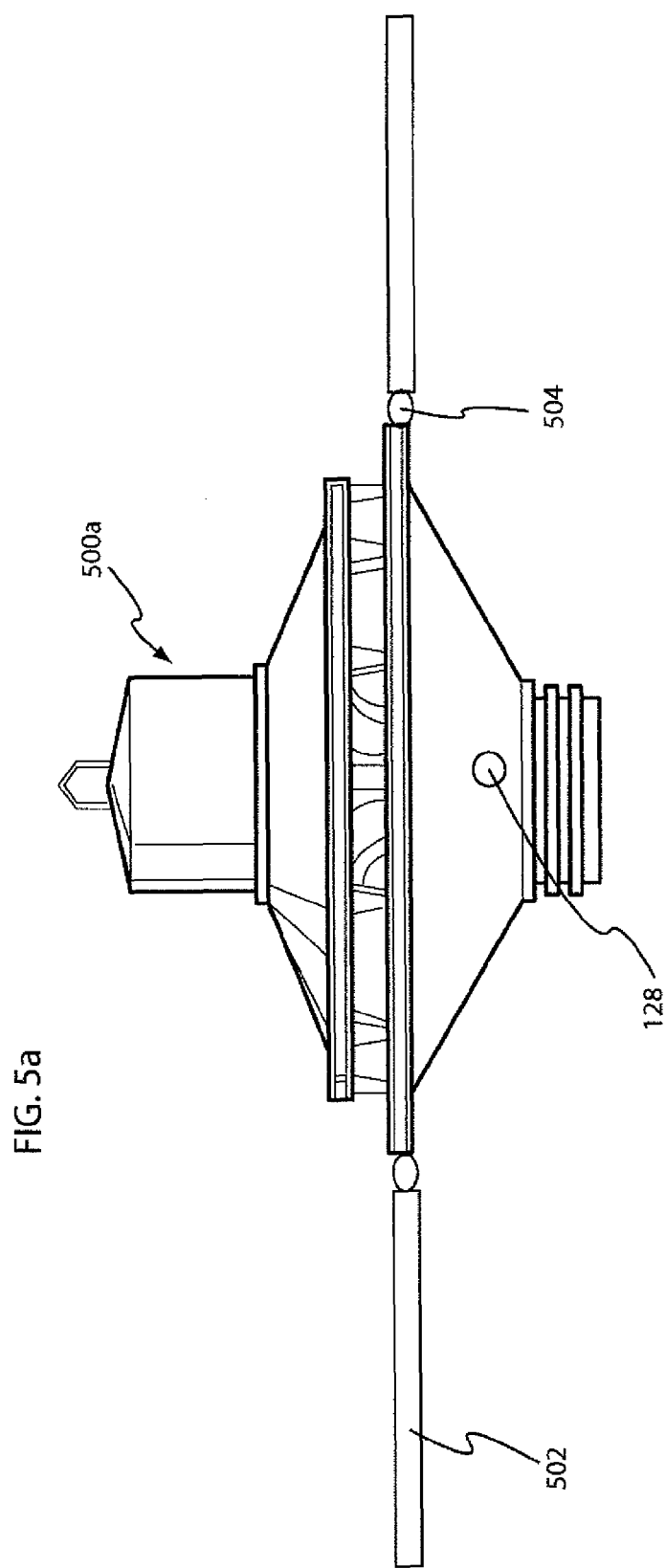
FIG. 5a illustrates a modification to the aerator/circulator of FIG. 5.

A modification of the aerator 500 described above is shown in FIG. 5a in which bio-mats 502, fabricated of recycled polyester, or other plastic, strands forming an open-weave mat, are anchored at a side surface of the aerator 500a at a point near the waterline. The bio-mats 502 are anchored to the aerator 500a using hinge members 504. The surface area of the bio-mat 502 is many times greater than a solid material having the same dimensions. The biomat must have sufficient amount of surface area to sustain and grow the microbes. The surface area is sufficient to consume the oxygen added and grow sufficient amount of microbes to break-down the waste nutrients present in the out flowing water. At too low a surface area, there is not sufficient area to support a thriving diverse biological community; at too high a surface area, the microbes grow across the gaps and plug the biomat. In another embodiment, the biosubstrate member 110 has a sufficient ratio of surface area of material to volume of material. For example, in an aspect of the present invention, the ratio of surface area to volume of the biomat ranges from about 200 ft$^2$ to about 700 ft$^2$ per cubic feet of material. In another embodiment, the ratio of surface area to volume of the biomat range from 250 ft$^2$ to about 600 ft$^2$ per cubic feet of material. In another embodiment, the ratio of surface area to volume of the biomat ranges from about 300 ft$^2$ to about 500 ft$^2$ per cubic foot of material. Although the biomat can be any shape, in one embodiment, the biomat is shaped like a coil, cylinder or spring. The biomat is preferably porous. In an embodiment, the biomat is open weaved to allow water to flow through fully, so that the microbes have access to nutritional rich, oxygenated water The open weave biomats are available at Polyflow Pond Filters, Acworth, Ga. The open weave allows water to freely flow through the biomat 502 so that the microbes have access to nutrient-rich water out flowing from the aerator 500. Freely flowing is defined as the elapsed time for 5 gallons of water to flow through a 1 ft×1 ft square of bio-mat 502 material that was immersed for six weeks is no more than 150% as the time for 5 gallons to flow through the same bio-mat before immersion. The bio mats 502 are buoyant in water or are made buoyant with floats (not shown) and thus float in a horizontal orientation at or near the water's surface. The outflow from the aerator 500 flows across and through the bio-mats 502. This arrangement allows aerobic bacteria to break down (i.e., digest) the waste nutrients present in the out flowing water efficiently. As with the aerator 500 of FIG. 5, the present aerator 500a is coupled to a pump 120 (not shown) by way of flanged pipe 128 to increase aeration of the out flowing water. The number of mats associated with a single aerator can vary depending on the strength of the waste. Usually, only enough mats are used to consume the amount of oxygen added. Skilled artisans will recognize that the number of mats can be varied to fit the needs of the particular site.

Wave-Generating Circulator

Shallow ponds are well known and are typically facultative ponds used for low cost aeration. Shallow ponds tend to build up deposits of solids suspended in the water column unless wastewater flow is restricted to fast moving channels.

Wastewater treatment usually requires adding large amounts of air to the water to allow microorganisms (i.e., microbes) to digest biological oxygen demand (BOD) into sludge and CO2. BOD is a standardized test, common in wastewater treatment, wherein BOD is the 5-day measure of how much oxygen is consumed by aerobic organism in a defined sample. The '351 patent teaches that physically sinking solids reduces the overall energy consumption by physically transferring the BOD load from the aerobic zone to the anaerobic zone. This strategy works very well in municipal and farm manure lagoons where much of the BOD load is insoluble.

Generally, speaking within the context of the present invention the aerobic zone is defined as a region of the water column that has sufficient dissolved oxygen to allow microbes to utilize oxygen for the digestion of nutrients into energy utilized by the microbe and $CO_2$ expelled by the microbe. Conversely, the process of digestion in anaerobic zones occurs substantially without the presence of dissolved oxygen.

Aerobic zones are usually found closest to the surface of the water column and the depth of the aerobic zone is, in large part, determined by the turbulence of the surface water, since turbulence, in the form of wave action, water falls, etc, create a mixing of surface and subsurface water. The turbulence also allows greater surface area of the water to come in contact with air, thus facilitating absorption of oxygen from the air by the water. On the other hand, anaerobic zones are generally found in stagnant areas of the water column. Often such areas are nearest the bottom of the water column.

In wastewater treatment ponds where the BOD load is mostly soluble, for example, in fruit juice processing plants or wineries, the problem is very different. The soluble BOD has to be made insoluble before it can be transferred to the anaerobic zone. In addition, produced sludge from wineries is very gassy and floats. The gas is stripped from the solids during daylight hours (and then sinks), but the gas floats to the surface during the night. Thus, there are special suspended solids, which have a diurnal change in apparent specific gravity.

Figure 6:
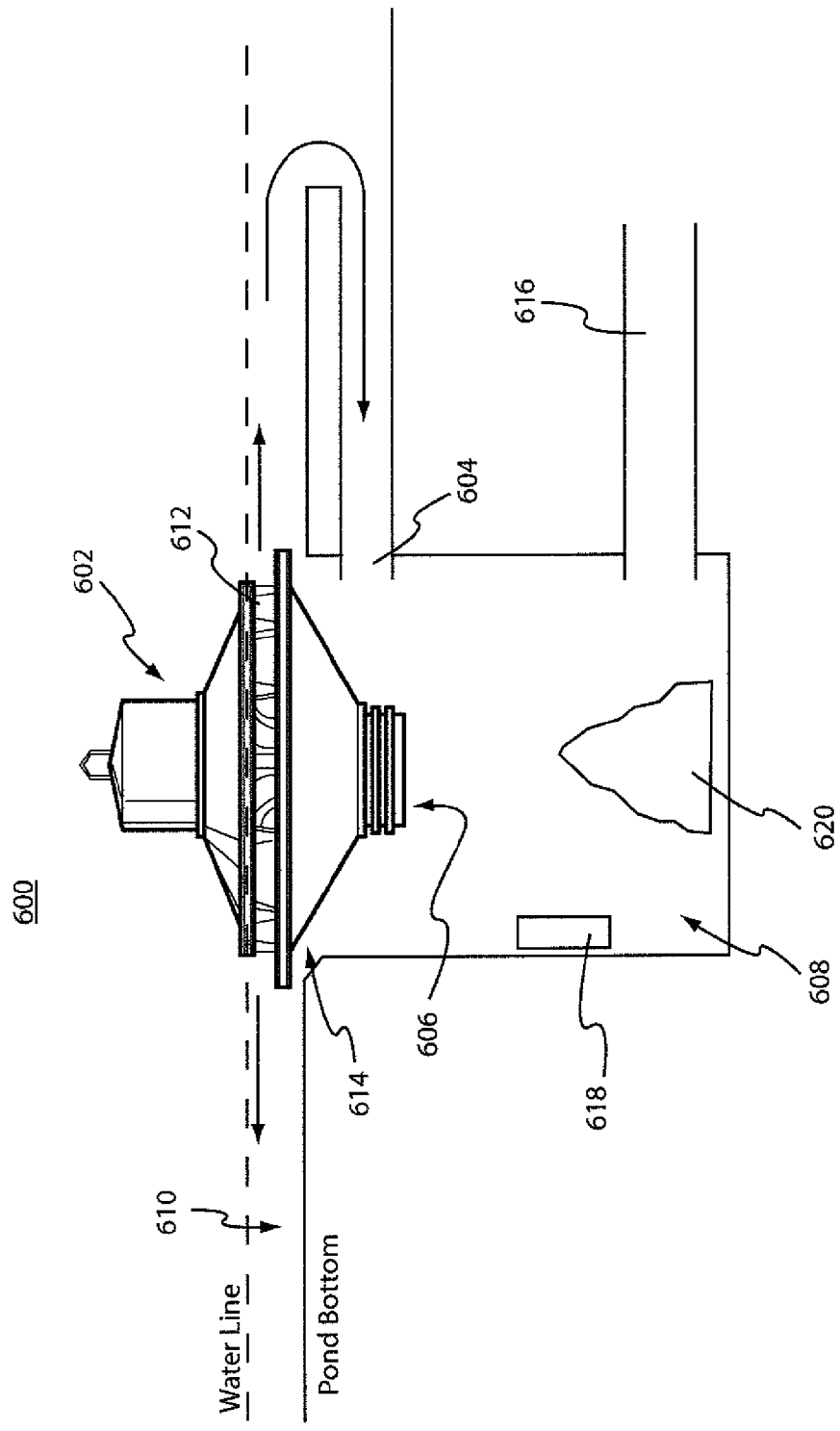
FIG. 6 illustrates an embodiment of a wave-generating circulator in accordance with the present invention.

A shallow pond can be used to increase the surface-to-weight ratio of the contained water using the wave-generating circulator system 600 shown in FIG. 6. The wave-generating system 600 includes a circulator 602 having similar design and components as the circulator disclosed in the '351 patent.

The circulator 602 is placed in a cylindrical recessed portion 608 of a shallow pond 610. An inflow section 604 runs underneath the shallow pond bottom and enters the recessed portion 608. A central inflow member 606 of the circulator 602 is positioned at a central axial position in the recessed portion 608. Water at an upper area of the recessed portion 608 is siphoned into the circulator 602 through the central inflow member 606 and expelled through radial outflow openings 612.

The wave-generating circulator 602 floats in a contained volume of water, and is restrained such that circulator motion relative to the recess portion 608 is confined to a substantially vertical up/down motion. As the wave-generating circulator 602 lifts water vertically, the wave-generating circulator 602 is displaced downward until the inherent buoyancy overcomes the downward force. This lifts the wave-generating circulator 602 upwards.

The net effect is a reciprocating down then up motion, which generates a continuing wave motion emanating radially from the circulator. Because the pond 610 is shallow, the wave amplitude is large and the surface area is increased. Increased surface area allows for more gas exchange between the fluid/suspended solids and the atmosphere. The wave amplitude increases mixing throughout the short water column.

In the case where gas occludes to solids, such as in winery produced waste solids, water is fed tangentially through the inflow section 604 into the recessed portion 608 to induce a centrifugal flow around the central inflow member 606. The tangential water feed can be generated by having the inflow section 604 enter the recessed portion 608 at an angle nearly parallel with the sidewall of the recessed portion 608. Alternatively, the tangential water feed can be generated by providing a bend in the inflow section 604 such that the inflowing water is directed along the sidewall of the recessed portion 608.

The water/solids fluid is substantially denser than the occluded gas. Thus, the gas leaves the solids and flows up and out of the recessed portion 608 through a gap 614 between the wave-generating circulator 602 and the surface of the recessed portion 608, while the solid now denuded of occluded gas sinks to the bottom of the recessed portion 608.

An outlet pipe 616 is placed in the conical pile to remove the condensed solids 620. The solids are moved using conventional means to a secondary treatment process (not shown). Optionally, an ultrasonic horn 618 is placed in fluid communication with the outlet pipe 616 to disrupt the solids 620 and make them easier to process or digest in downstream operations.

The unexpected benefit of this system is a reduction in energy consumption in aerated ponds. The shallower the pond, the steeper the wave motion and the larger the increase in oxygen transfer. The wave-generating system 600 can aerate/mix a high strength waste via surface area increase rather than by horsepower increase.

Additionally, the gas released in the contained volume increases biological activity by removing the waste products of the biological metabolism. The swirling motion causes larger, older organisms to settle to the bottom of the contained volume forming sediment, while leaving smaller, younger organisms in the supernatant. A particular example of this benefit is in the production of algae to make liquid fuel. The younger organisms are in the logarithmic growth phase of the lifecycle, and thus are more active in converting organic matter into algae mass.

The net effect is to have a higher concentration of active organisms in the high surface area pond and a higher concentration of inactive organisms in the concentrated solids cone. The system selects for less active organisms and removes them from the biologically active shallow pond. The effect of wave generation in a shallow pond combined with centrifugal, gas-separating inflow and large-solids precipitation makes a shallow pond into an efficient bioreactor.

The addition of an ultrasonic horn disrupts the large-solids without affecting the smaller solids. Disrupting large-solids aids in downstream processing. The ultrasonic horn is also useful in reducing, for example, pathogens. The wavelength of the ultrasonic vibration can be tuned to match the resonant frequency of targeted organisms. Using a variable wavelength ultrasonic horn allows tuning the frequency or frequencies without undue experimental difficulties to find an optimum range of frequencies for the specific application and targeted organisms. At the experimentally-determined optimum frequency for a particular organism, the cell wall is disrupted or the oxygen-carrying vacuoles are disturbed effectively killing the organism and causing the contained fluids to be released. Downstream recovery of internal fluids, such as algal oil, or subsequent anaerobic digestion of the cell fragments is facilitated.

Hydraulic Dam System

When treating winery waste that is very high in soluble BOD (~7,313 mg/l BOD, 90% soluble), the '351 patent adds sufficient oxygen to allow aerobes to convert soluble BOD into insoluble BOD in well-known ways. The '351 patent aerator sinks the produced sludge and anaerobic activity converts the waste into gas. However, winery sludge is so biologically productive that the produced gas attaches to the remaining solids and floats the solids to the surface. This unexpected effect mixes the previously clarified surface water. The floating sludge problem is diurnal. During the dark hours, the gas floats the sludge. However, when sunlight heats the dark-colored solids, gas is released, rendering the sludge less buoyant. This up and down cycle mixes previously clarified surface water. With sludge at the aerated surface, aerobic organisms out-compete facultative and anaerobes in the aerated surface water; the dissolved oxygen (DO) is consumed and the surface DO drops. This phenomenon is also observed in sludge holding ponds when treated with the circulators disclosed herein.

Figure 7:
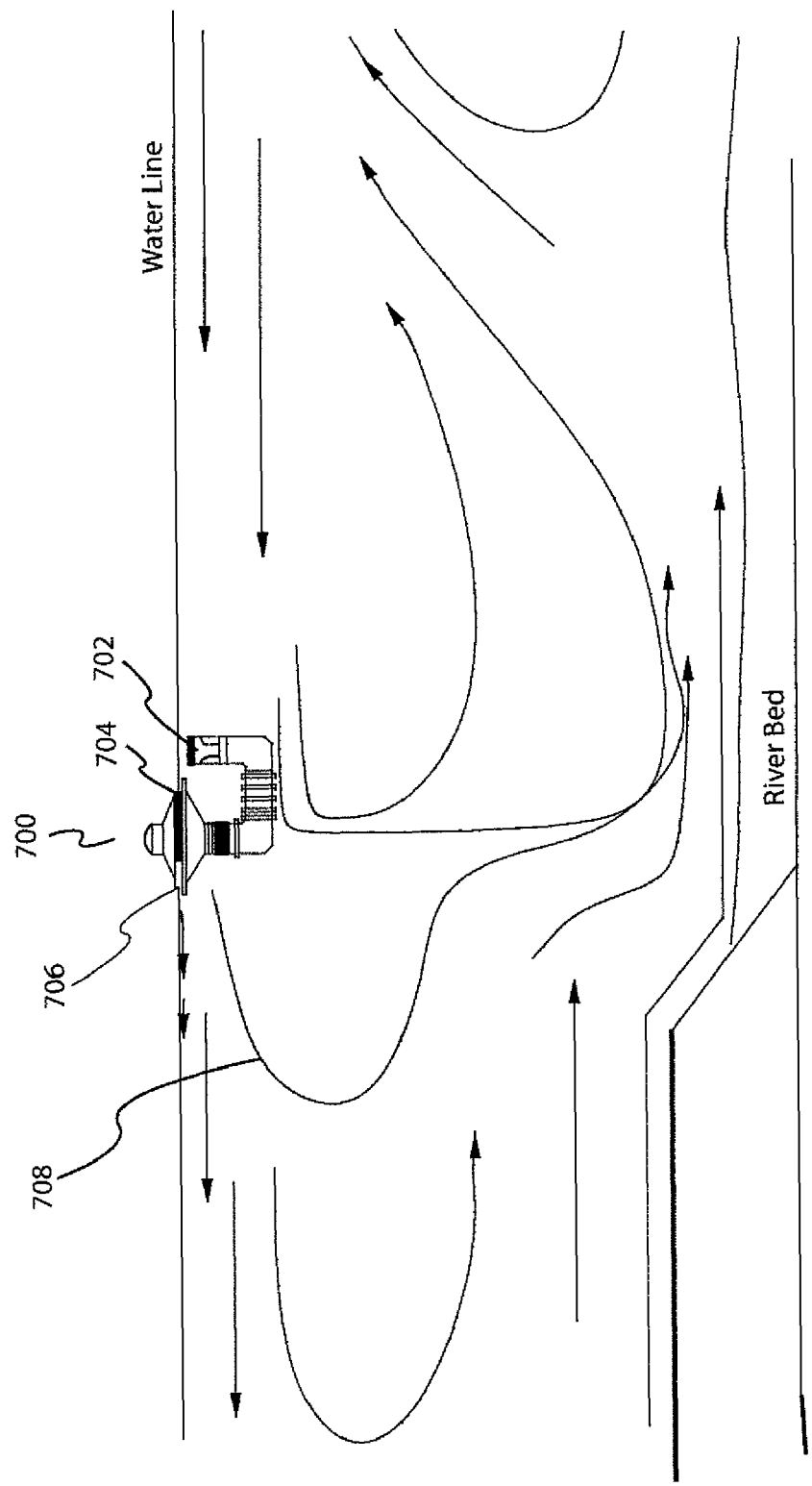
FIG. 7 illustrates an embodiment of a hydraulic dam system in accordance with the present invention.

FIG. 7 shows a circulator 700 having a single-J inlet 702 combined with an outflow deflector 704 blocking upstream outlets 706 of the circulator 700. The circulator 700 is of the type shown in FIG. 3 and described in the associated passages above. This configuration has the unexpected result of creating a "hydraulic dam". Clarified surface water is sent downstream from the open half of the circulator 700. The excess oxygenated outflow water meets resistance from the downstream water, and thus is pushed up over the heavier old water. This submersion of old surface water in this way is referred to as downwelling. The net effect is surface water flows downstream and excess surface water is pushed down and back upstream. Consequently, a line of resistance is created across the channel. This embodiment has great value when treating a navigation canal of dirty water, since the hydraulic dam created in this way does not impede boat traffic on the waterway and does not require installing an earthen dam or equivalent. It is of particular value in rivers subject to flooding. The hydraulic dam floats up and down with water level, keeping surface treatment conditions substantially constant.

Without the hydraulic dam, the surface water is commingled with foul sub-surface water; with the hydraulic dam, only clarified surface water is sent downstream.

The hydraulic dam creates an upstream waterfall effect. The combination of a waterfall and a hydraulic dam "seals" the cross section of the canal and prevents any net outflow of sub-surface water. The sealing is understood not in a literal sense, but rather a cross flow resistance is created for sub-surface flow and a lower resistance for surface outflow.

Water Treatment System—Overview

The organic cleaning process, however, requires that the water remain confined in a treatment area. This confinement of water is relatively easy to maintain in a closed body of water, but in a river, such confinement is difficult. When cleaning a river, booms can be deployed to slow the flow of water through a section of river. However, the use of booms to restrict water flow is not practical on large rivers that have significant boat travel or floating debris, because the booms would create obstacles which can impede boat travel and restrict movement of the floating debris. The floating debris can cause damage to the booms and circulators as well. The water cleaning system of the present invention combines the multiple circulators, sterilizers and aerators described above to increase the biological processes of a river to break down organic waste.

The following detailed explanation of the various sub-systems of the water cleaning system is intended as illustrative only. Sub-systems may be rearranged, eliminated, or added as necessary depending on the specific requirements of the water treatment project as well as the overall typography of the waterway being treated. For example, an ideal river without any tributaries flowing into the treatment site would consist of the sub-systems described hereinafter. However, certain sub-systems may need to be duplicated at each tributary inflow point The present water treatment system and process is provided in a moving body of water. The moving body of water provides fluid communication between the various sub-systems deployed in the water treatment system. As defined within the present disclosure, a moving body of water is any water system that has a current flow and is generally bounded on at least two opposing sides by landmasses. While such a definition can be construed to encompass a sea or an ocean, such bodies of water would require an impractical number of circulators of the types described above to effectively provide the water treatment. Thus, one of ordinary skill in the art, once having fully read the below process and system, would be capable of determining the proper limits of the size and types of moving bodies of water in which the present invention can be appropriately and practically applied. However, generally speaking, all rivers, streams, certain lake systems having the required current flow, canals, and channels, fresh, brackish and saltwater, are all appropriate for implementation of the water treatment system disclosed hereinbelow.

Water Treatment System—Sub-System 1

Figure 8:
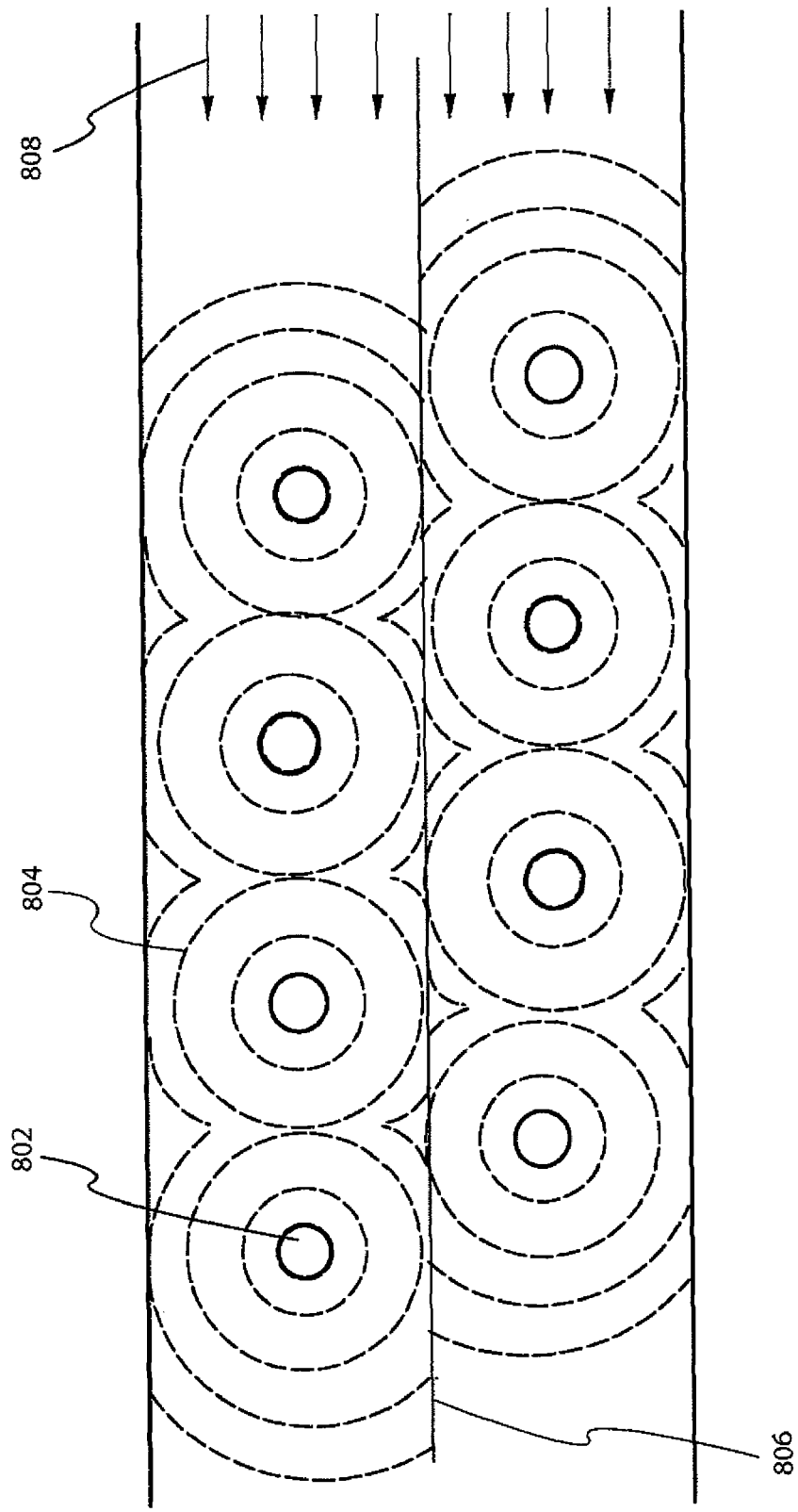

At sub-system 1, shown in FIG. 8, a series of '351 circulators 802 are arranged in multiple staggered rows. In an embodiment of the present sub-system, the circulators 802 are spaced approximately 10 meters apart. The arrows 808 signify the direction of current flow from right to left. For convenience, current flow from right to left is maintained throughout the remaining figures.

The dashed lines 804 represent outflow from each individual circulator 802. At points of intersection, represented generally in FIG. 8 by a central solid line 806, between the outflows of two circulators 802, a downwelling of surface water occurs. In other words, at the intersection 806, the outflow water of the two circulators creates an interference flow, which pushes the surface water up at the interference and then downward once the "pile" is sufficiently high to have gravity push the water down. This effect is similar to the boom redirection effect described in the '351 patent. However, in the present invention, the boom is not necessary. Removal of the boom is advantageous in that the river remains navigable for boat traffic and for floating trash to by-pass the system.

At sub-system 1, the system begins the water treatment process by inducing a mixing effect between the upper region and lower region of the water. This process aerates the water somewhat, as well as suspending solid waste that may have fallen out of the water column. Some bacteria, especially facultative bacteria, may begin processing of the waste at this sub-system as well. Facultative bacteria can grow in aerobic and anaerobic conditions. These bacteria will ferment produced sludge and liquefy it, thus initiating the process for digesting sludge in situ.

Moreover, sub-system 1 operates as a microbe selector. By deliberately controlling the oxygen added in sub-system 1, aerobic organisms are selected against, in favor of facultative, sludge-liquefying organisms. Sulfur reducing bacteria are consumed by the growing facultative population in sub-system 1 such that production of sulfur compounds is greatly reduced, thus reducing malodor emitted by the treatment area.

Water Treatment System—Sub-System 2

Figure 9:
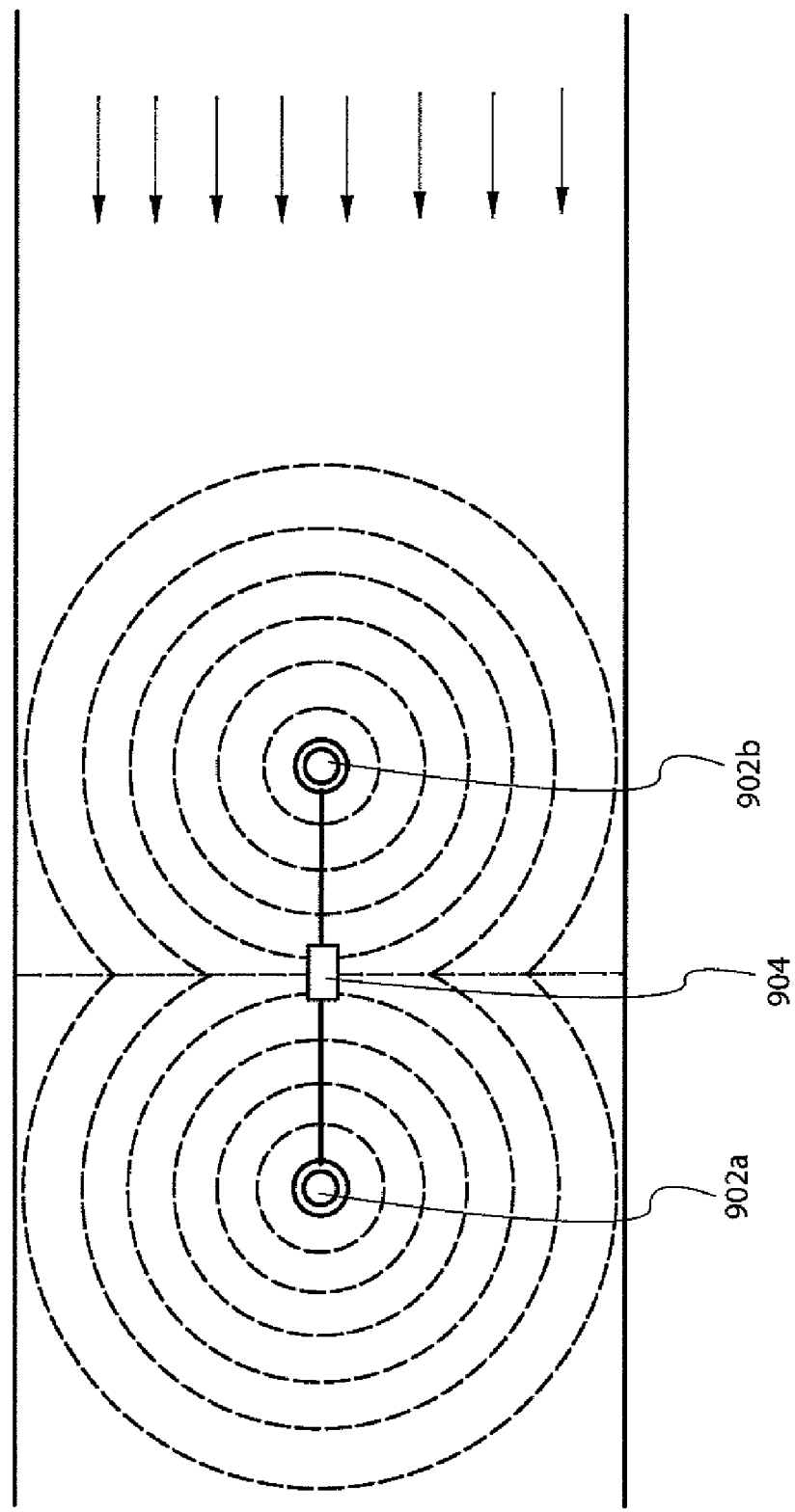

In sub-system 2, significant aeration takes place. Turning to FIG. 9, sub-system 2 is defined by at least a pair of aerators 902a and 902b. Collectively the pair of aerators 902a and 902b is referenced hereinafter by reference numeral 902. The aerator pair 902 is coupled together with an aeration pump 904 that provides air to a venturi assembly (not shown). As described above, the aerators effectively increase the dissolved oxygen at the top layer of the water column. Dissolved oxygen is an important component in the biological processing of organic waste because at a minimum it facilitates conversion of soluble BOD into insoluble sludge by microbes.

Water Treatment System—Sub-System 3

Figure 10:
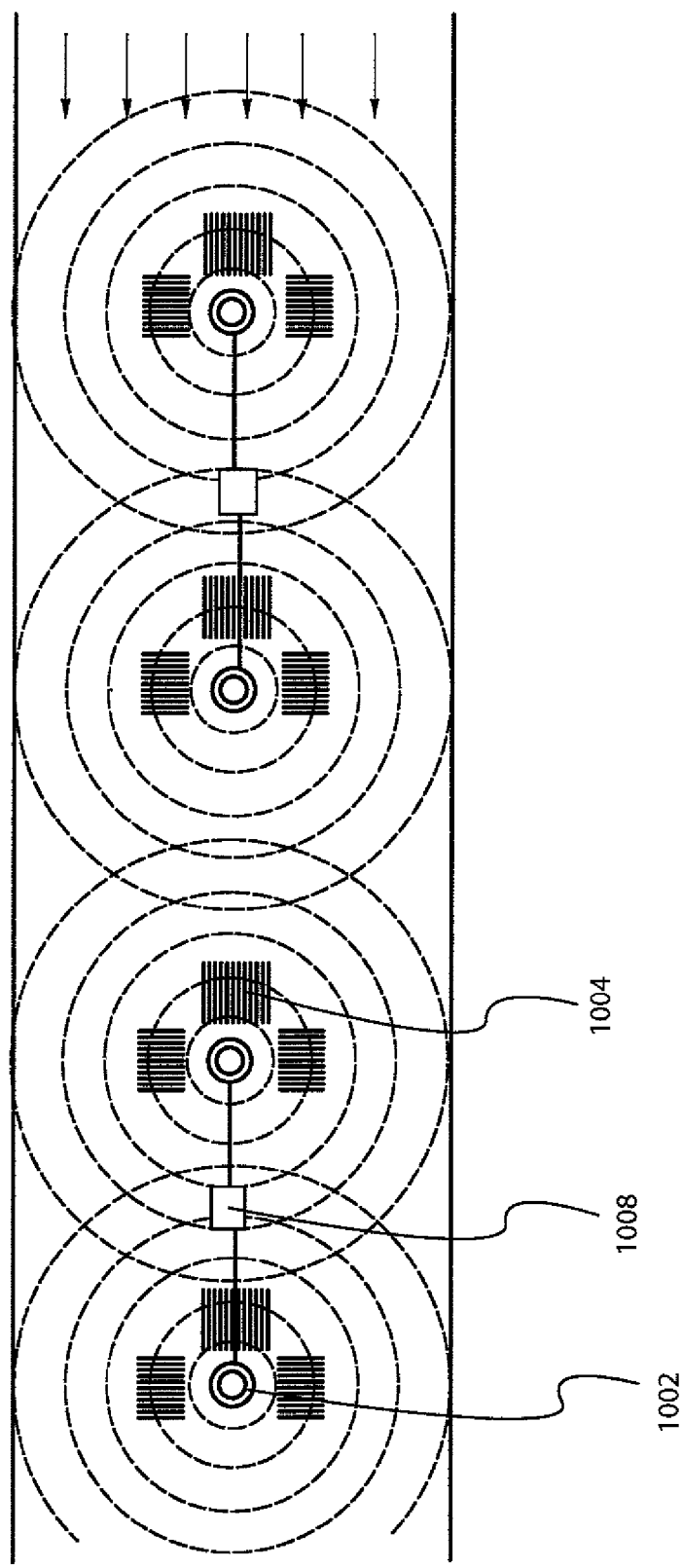

Sub-system 3, shown in FIG. 10, reduces biological oxygen demand (BOD), Nitrogen, and some waterborne pathogens. Specifically, sub-system 3 has a plurality of aerators 1002 equipped with bio-mats 1004. As described above, the bio-mats 1004 provide a surface for microbe populations to grow near the outflow of highly aerated water. Such an arrangement provides optimal aerobic processing of waste nutrients in the water. The aerators 1002 are coupled as pairs with water pump 1008 connecting each aerator 1002 in the coupled pair. The water pump 1008 supplies motive water to the gas-water venturi assembly of both aerators 1002, thus adding up to 300 kg $O_2$/day per circulator as air bubbles for aerating the outflow water.

In sub-system 3, water from upstream is suctioned by the plurality of aerators 1002. The aerators inject air into the inflow water using venturis coupled to air pumps 1008, thus aerating and oxygenating the inflow water. The inflow water is then ejected from the outlet ports of the aerator 1002. The out flowing water passes over bio-mats 1004 connected to the aerator 1002. The bio-mats 1004 are attached on as many sides of the aerator as needed to clean the water (three per aerator shown) 1002. The oxygen-rich water is cleaned of suspended organic matter by the feeding processes of the microbes residing on the mats.

In particular, nitrification/de-nitrification organisms thrive on bio-mats. When the DO>4 mg/l, nitrification bacteria thrive. Their effluent feeds the de-nitrification bacteria in well-known pathways and ammonia is converted in nitrogen gas. In traditional systems, the carbon load has to be low before the nitrification bacteria can compete successfully. In dirty river systems prone to flooding, this condition cannot be reliably achieved. The bio-mats are small relative to the river surface area, but by being confined adjacent to an oxygen-rich circulator, a micro climate of DO>4 is produced and ammonia can be reduced in a "too-dirty" environment.

In FIG. 10, the aerator/bio-mat units (collectively, 1002, 1004, and 1008) are shown in a single file. However, if installed in a waterway that is significantly wider than about 16 meters, multiple rows of nested aerator/bio-mat units may be used.

The nesting strategy is shown in FIG. 8. This nesting can be massively parallel to fit the width of the river. The bio-mats are excellent vehicles for oxidizing and then reducing ammonia to harmless $N_2$ gas. In a preferred embodiment, the FIG. 9 installation is replicated as needed to reduce the BOD to <100 mg/l and then the FIG. 10 arrangement is installed. This arrangement works best because aerobic carbon-BOD-reducing microbes work faster than ammonia oxidizing microbes. When the arrangement is reversed, the carbon microbes outcompete nitrogen microbes for available oxygen and there is little ammonia reduction.

Water Treatment System—Sub-System 4

Figure 11:
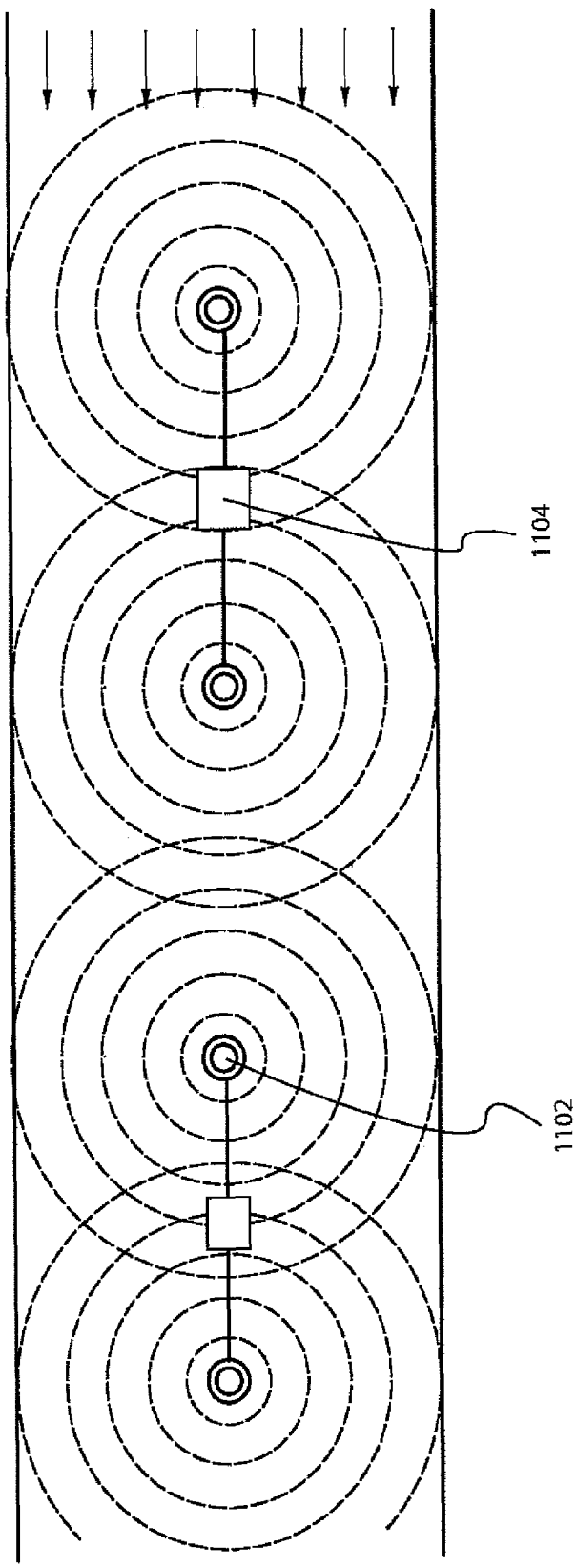

Sub-system 4, shown in FIG. 11, acts as an oxidation and sedimentation basin.

Specifically, a series of aerators 1102 are arranged in line and connected in pairs with an air pump 1104. The aerators in this sub-system are used to oxygenate the water via venturis. Additionally, the fine bubbles generated by the aerators cause a decrease in the specific gravity of the water column, facilitating sedimentation of organic solids, which have densities greater than the oxygenated water, and thus fall out of the water column.

It should be noted that in biologic-based water treatment, maintaining proper oxygenation levels in the water is necessary both for optimal waste removal efficiency of the aerobic microbes and for the general health of the wildlife present in the water. A biologic-based water treatment system can rapidly deplete water of oxygen if not properly oxygenated, leading to fish kills. Therefore, sub-system 4 systems should be placed after large scale biologic treatment, such as occurs in sub-system 3, previously described.

Water Treatment System—Sub-System 5

Figure 12:
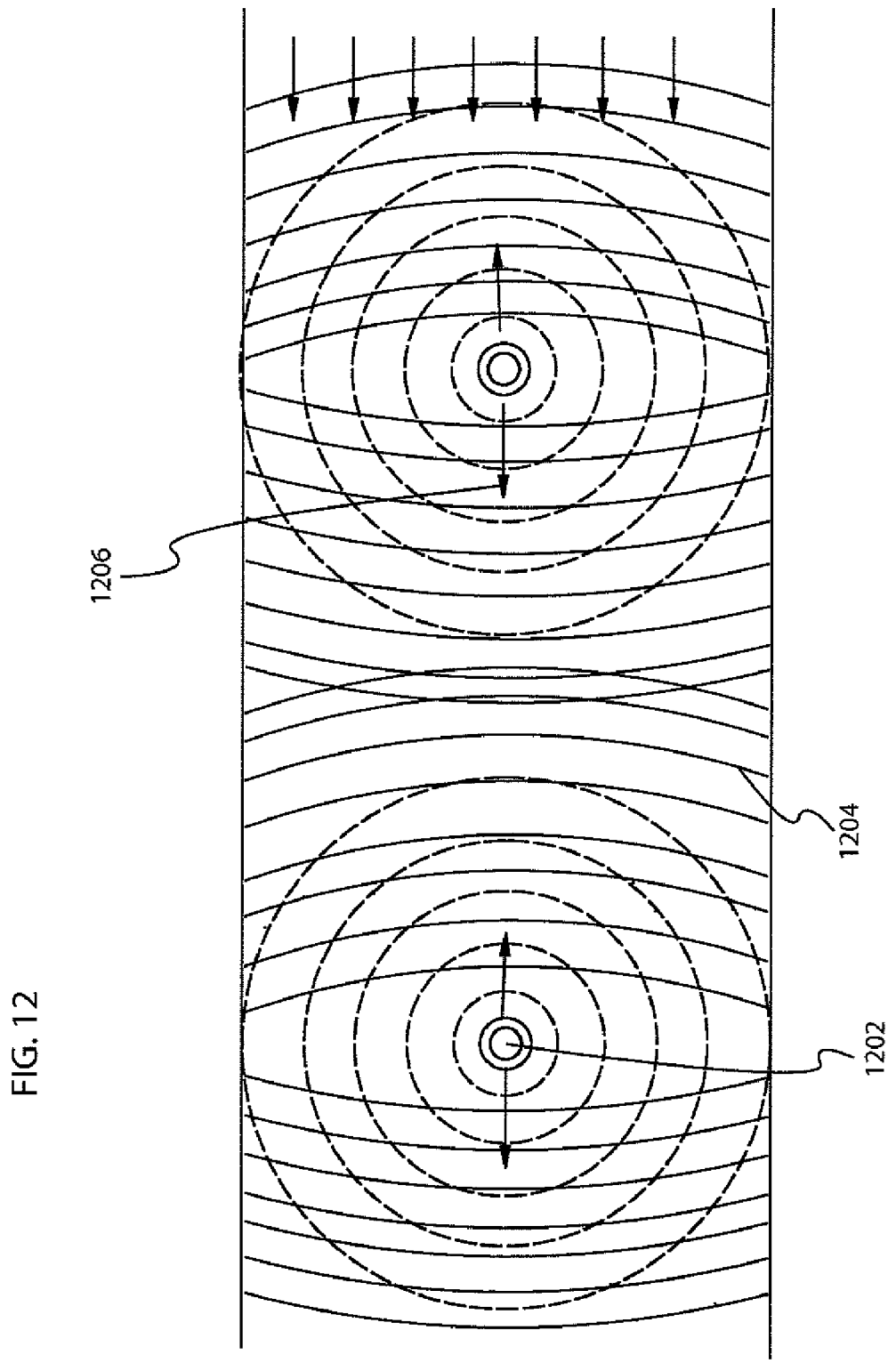

Sub-system 5 provides pathogen reduction and polishing of the water. As shown in FIG. 12, a series of sterilizing circulators 1202 are arranged to provide a blanket of ultrasonic energy 1204 across the entirety of the river section. The arrows 1206 indicate the direction of propagation of the ultrasonic energy 1204.

This sub-system is disposed along at least an up to 300 meter section of river to allow for adequate contact time between the pathogens, such as coliform bacteria, and the ultrasonic energy 1204 to ensure optimal destruction of the pathogens in the water column. Algae may also be advantageously destroyed by the ultrasonic energy as well.

Different ultrasonic horns have different output power. Skilled artisans will recognize that more powerful horns will project farther than less powerful horns.

Water Treatment System—Sub-System 6

Figure 13:
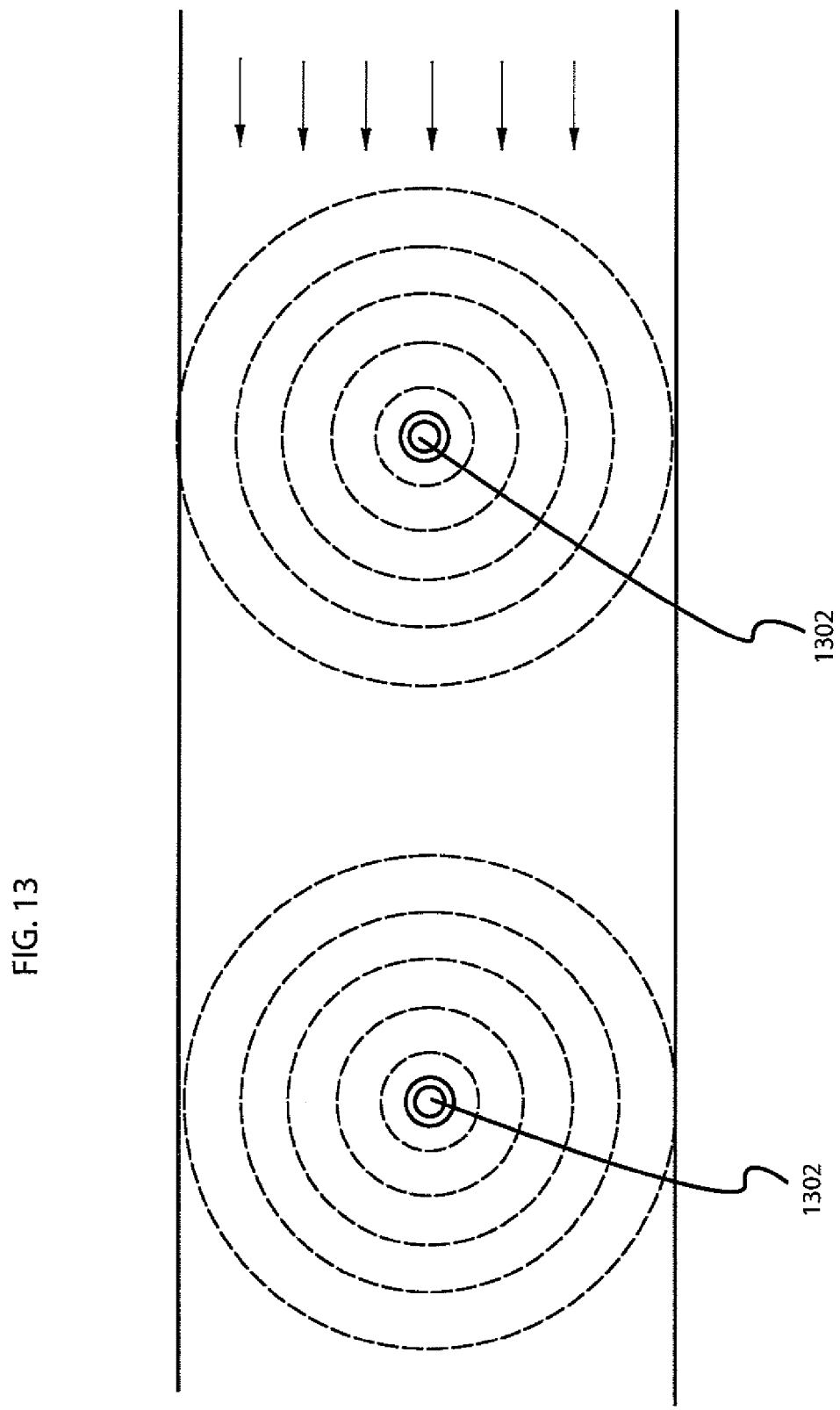

A settling/polishing sub-system is shown in FIG. 13. In the settling/polishing sub-system, a number of circulators 1302 are used to create circulation in the water column. This circulation allows any remaining organic matter to settle to the bottom of the body of water. As the organic matter settles the water becomes clearer, hence the term "polishing". The circulators used in this sub-system are the circulators depicted in FIG. 1 and 1a, but without the J-shaped intakes. Instead, the intakes are more submerged for mixing surface water with deeper water. The circulators in U.S. Pat. No. 7,329,351 can be utilized in this subsystem. The circulators are horizontal nets. There is a cap over the end and holes are cut in the column such that the intake flow is horizontal. This arrangement keeps the black water out of the system.

Water Treatment System—Sub-System 7

Generally, by the time the water reaches sub-system 7 of the water treatment system, most organic matter and pathogens have been neutralized. However, some organic matter may still be present in the water column. Specifically, clean, clear water is disposed at the top meter of the water column, while the remainder of the water column becomes progressively dirtier as the depth increases. Therefore, it is advantageous to provide a means to limit downstream water flow to only the water in the upper portion of the water column, as this water is the cleanest.

Unfortunately, a conventional, physical dam often cannot be placed across a river, because rivers are commonly used both for transportation of goods and for recreational boating. A physical dam would hinder these uses. Moreover, construction of a dam is expensive, labor intensive and time consuming.

The final sub-system, shown in FIG. 14, of the water treatment system of the present invention provides a hydraulic dam 1400 to prevent water that still requires further treatment from passing further downstream without the need of erecting a physical dam. The hydraulic dam 1400 is represented by the space bounded by the thick dashed lines.

The hydraulic dam 1400 is generated using the hydraulic dam system disclosed above. A series of circulators 1402 outfitted with single J intakes 1404 are arranged in a line spanning the width of the waterway. An optional boom 1406 maybe disposed between adjacent circulators 1402 as well. When the boom is not deployed, nested hydraulic dam circulators, arranged in a manner similar to the arrangement of '351 circulators shown in FIG. 8, is used. The intersecting flow patterns create the functional equivalent of booms. The boom-free execution is particularly advantageous in wide rivers or rivers with excess floating trash, for example in rivers prone to seasonal flooding.

Surface water to a depth of approximately 1 meter is clarified of organic matter and pathogens to the desired level. Hence the water from this level of the water column has been treated enough to pass out of the treatment system and proceed downstream as indicated by the solid arrows 1408. However, water below this surface region may still contain undesirable organic matter, and thus must be held within the treatment system until this water, too, reaches the proper clarity level. This dirty water is held back by the previously disclosed downwelling of excess clean water. The dirty water is, consequently, deflected back upstream, as indicated by dashed arrows 1410.

In addition to the sub-systems described above, another sub-system may be provided downstream of the hydraulic dam, as shown in FIG. 15. This sub-system provides additional clarification, i.e. polishing, of the water The polishing in this sub-system is performed by a series of paired aerators 1502. The aerators 1502 are each equipped with double J-shaped intake tubes 1504 and coupled with one another by way of aerator pump 1506. As described previously, the aerators 1502 generate micro-bubbles that reduce the specific gravity of the water. Consequently, organic matter having a density greater than the micro-bubble containing water will settle out of the water column and onto the river bed.

River treatment systems are also possible without the hydraulic dam. A physical dam can be erected in place of the hydraulic dam. An overflow of the physical dam would allow the transfer of clarified surface water downstream. The wall of the physical dam prevents foul bottom water from proceeding downstream. In that case, a river treatment process comprises the following steps as described herein, with the sludge being digested in situ:

1. Selection for sludge liquefaction organisms
2. Oxidation of soluble BOD
3. Optionally, nitrification/de-nitrification
4. Pathogen Reduction
5. Clarification
6. In situ sludge digestion The in situ sludge digestion sets this process apart. In other systems, sludge is recovered and treated separately or in lagoons, allowed to accumulate for years. In the linear treatment system described above, the sludge is digested as produced. Traditional wastewater systems produce, $CO_2$, sludge and some methane. The inventive process does not accumulate sludge.

Turning to FIG. 16, an overview of a water treatment system of the present invention is shown, which employs the various sub-systems described above. The water treatment system is installed on a river flowing in the direction indicated by arrows 1600.

The first section 1602 of the river is disposed with the sub-system shown in FIG. 8. This subsystem provides selection of certain sludge-liquefaction organisms over malodor producing organisms. The selection is performed as described above in the sub-system 1 section of the disclosure using '351 circulators to control the dissolved oxygen level and nutrient availability within the water column.

In this particular case, the second section 1604 of the river is disposed with the sub-system shown in FIG. 11, previously identified as sub-system 4. The second section 1604 acts as an oxidation and sedimentation basin in which a series of aerators 1102 are arranged in line and connected in pairs with an air pump 1104, as shown in FIG. 11. The fine bubbles generated by the aerators cause a decrease in the specific gravity of the water column, facilitating sedimentation of organic solids, which have densities greater than the oxygenated water, and thus fall out of the water column.

The river water flows from the second section 1602 to the third section 1606 of the river, which is disposed with sub-system 3, shown in FIG. 10. The sub-system in the third section 1606 reduces biological oxygen demand (BOD), Nitrogen, and some waterborne pathogens by employing a plurality of aerators 1002 equipped with bio-mats 1004. As described previously, the bio-mats 1004 promote an increase in beneficial microbe populations near the outflow of the aerators 1002. In this way, the sub-system of the third section 1606 increases the efficiency of BOD and Nitrogen reduction.

Moving now to the fourth section 1608 of the river, sub-system 5, shown in FIG. 12, is deployed. In the fourth section 1608, reduction of pathogens is accomplished using a plurality of sterilizers, as described above.

In the fifth section 1610 of the river, the super clarification sub-system shown in FIG. 15 is deployed to further clarify the water flowing downstream. The water polishing in the fifth section 1610 is performed by a series of paired aerators 1502, as shown in FIG. 15. The aerators 1502 are each equipped with double J-shaped intake tubes 1504 and coupled with one another by way of aerator pump 1506. As described previously, the aerators 1502 generate micro-bubbles that reduce the specific gravity of the water. Consequently, organic matter having a density greater than the micro-bubble containing water will settle out of the water column and onto the river bed.

The final section 1612 of the river in the present embodiment employs a dam. The dam may be a physical dam as conventionally known, or the dam may be a hydraulic dam as shown in FIG. 14. In both cases, the dam is adapted to block the flow of water such that only the top most layer of water, and thus the cleanest water, is allowed to flow over the dam and continue downstream.

As indicated in the embodiment shown in FIG. 16, not all the sub-systems described previously need be used in every deployed water treatment system. Rather the system is intended to be tailored to the individual river system being treated.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A system for reducing organic waste in a body of flowing water, the system comprising:
 a selection sub-system for selecting sludge-liquefaction organisms and selecting against malodor-producing organisms;
 a plurality of subsequent treatment sub-systems linearly disposed downstream of and in fluid communication with the selection sub-system, each of the plurality of treatment sub-systems having one or more circulators, aerators or sterilizers; and
 a damming sub-system having a plurality of circulators for restricting downstream water flow across a selected location on a moving body of water, the damming sub-system being positioned at a terminal end of the plurality of treatment sub-systems.

2. The system as in claim 1, wherein the damming sub-system is a hydraulic dam formed by water flow back pressure exerted by downstream water flow resistance to outflow water from the circulators, the hydraulic dam being configured for resisting downstream flow of subsurface water, allowing at least a portion of treated surface water to flow downstream.

3. The system as in claim 1, wherein the damming sub-system is a physical dam having an overflow portion positioned to allow downstream flow of clarified surface water and a dam wall for preventing downstream flow of foul subsurface water.

4. The system as in claim 1, wherein the selection sub-system includes a plurality of water circulators configured for mixing water of a water column of a section of the body of water being treated.

5. The system as in claim 1, wherein the treatment sub-systems include an aeration sub-system comprising a plurality of aerators for oxygenating the water to a desired dissolved oxygen level.

6. The system as in claim 1, wherein the treatment sub-systems include a nutrient reduction sub-system comprising a plurality of aerators, each aerator disposed with a plurality of bio-mats anchored to a side of the each aerator and free-floating near the water surface, the bio-mats having a large surface area to weight ratio adapted for facilitating aerobic bacteria colonization of the bio-mats.

7. The system as in claim 1, wherein the treatment sub-systems include an oxidation/sedimentation sub-system comprising a plurality of aerators configured for generating microbubbles for reducing specific gravity of a portion of the body of water being treated by the oxidation/sedimentation sub-system.

8. The system as in claim 1, wherein the treatment sub-systems include a sterilization and polishing sub-system comprising a plurality of sterilizers fitted with ultrasonic horns for generating ultrasonic energy at selected frequencies capable of killing microbes present in the body of water.

9. The system as in claim 1, further comprising a final clarification sub-system disposed at a downstream location from the damming sub-system, the final clarification sub-system including a plurality of aerators equipped with a double-J water inlet, the final clarification sub-system reducing specific gravity of a portion of the body of water being treated by the final clarification sub-system allowing fine suspended matter present in the body of water to sediment out of a water column of the body of water.

10. A system for reducing organic waste in a body of water, the system comprising:
a damming sub-system having a plurality of circulators for restricting downstream water flow across a selected location on a moving body of water; and
a plurality of treatment sub-systems linearly disposed upstream of and in fluid communication with the damming sub-system, each of the plurality of treatment sub-systems having one or more circulators, aerators or sterilizers.

11. The system as in claim 10, wherein the damming sub-system is a hydraulic dam formed by water flow back pressure exerted by downstream water flow resistance to outflow water from the circulators, the hydraulic dam being configured for resisting downstream flow of subsurface water, allowing at least a portion of treated surface water to flow downstream.

12. The system as in claim 10, wherein the damming sub-system is a physical dam having an overflow portion positioned to allow downstream flow of clarified surface water and a dam wall for preventing downstream flow of foul subsurface water.

13. The system as in claim 10, wherein the treatment sub-systems include a selection sub-system comprising a plurality of water circulators configured for mixing water of a water column of a section of the body of water being treated.

14. The system as in claim 10, wherein the treatment sub-systems include an aeration sub-system comprising a plurality of aerators for oxygenating the water to a desired dissolved oxygen level.

15. The system as in claim 10, wherein the treatment sub-systems include a nutrient reduction sub-system comprising a plurality of aerators, each aerator disposed with a plurality of bio-mats anchored to a side of the each aerator and free-floating near the water surface, the bio-mats having a large surface area to weight ratio adapted for facilitating aerobic bacteria colonization of the bio-mats.

16. The system as in claim 10, wherein the treatment sub-systems include an oxidation/sedimentation sub-system comprising a plurality of aerators configured for generating microbubbles for reducing specific gravity of a portion of the body of water being treated by the oxidation/sedimentation sub-system.

17. The system as in claim 10, wherein the treatment sub-systems include a sterilization and polishing sub-system comprising a plurality of sterilizers fitted with ultrasonic horns for generating ultrasonic energy at selected frequencies capable of killing microbes present in the body of water.

18. The system as in claim 10, further comprising a final clarification sub-system disposed at a downstream location from the damming sub-system, the final clarification sub-system including a plurality of aerators equipped with a double-J water inlet, the final clarification sub-system reducing specific gravity of a portion of the body of water being treated by the final clarification sub-system allowing fine suspended matter present in the body of water to sediment out of a water column of the body of water.

19. A method for reducing organic waste in a body of water, the method comprising:
generating a hydraulic dam across a selected location on a moving body of water by generating a downwelling of water; and
providing a plurality of treatment sub-processes linearly disposed upstream of and in fluid communication with the hydraulic dam, each of the plurality of treatment sub-processes having one or more circulators, aerators or sterilizers.

20. The method as in claim 19, wherein the hydraulic dam is formed by water flow back pressure exerted by downstream water flow resistance to outflow water from circulators disposed across a section of the body of water, the hydraulic dam being configured for resisting downstream flow of subsurface water, allowing at least a portion of treated surface water to flow downstream.

21. The method as in claim 19, wherein the treatment sub-processes include a selection process for mixing water of a water column of a section of the body of water being treated.

22. The method as in claim 19, wherein the treatment sub-processes include an aeration process for oxygenating the water to a desired dissolved oxygen level.

23. The method as in claim 19, wherein the treatment sub-processes includes a nutrient reduction process for facilitating aerobic bacteria colonization of the bio-mats using a plurality of aerators, each aerator disposed with a plurality of bio-mats anchored to a side of the each aerator and free-floating near the water surface, the bio-mats having a size range from about 200 $ft^2/ft^3$ to about 700 $ft^2/ft^3$ of material.

24. The method as in claim 19, wherein the treatment sub-processes include an oxidation/sedimentation process for generating microbubbles for reducing specific gravity of a portion of the body of water being treated by the oxidation/sedimentation sub-system.

25. The method as in claim 19, wherein the treatment sub-processes include a sterilization and polishing process for generating ultrasonic energy at selected frequencies capable of killing microbes present in the body of water.

26. The method as in claim 19, further comprising a final clarification process disposed at a downstream location from the hydraulic dam, the final clarification process including reducing specific gravity of a portion of the body of water being treated by the final clarification process allowing fine suspended matter present in the body of water to sediment out of a water column of the body of water using a plurality of aerators equipped with a double-J water inlet.

27. A sterilizing water circulation apparatus comprising:
an upper float chassis with a wider lower base thereof being equipped with an annular water outflow lip at essentially the surface level of the water;
a sectional diverter for water being arranged in a lower portion of the upper float chassis, the sectional diverter facilitating a generally horizontal laminar outward flow through a spacing between the outflow lip and the upper end of the sectional diverter, along the surface of the water in which the sterilizing water circulation apparatus floats;

motor-driven means being mounted on the upper float chassis connected to a rotatable screw drawing water into a lower open end of a circulator device effectuating a flow of the water towards the spacing, the screw being adapted to minimize bubble formation in the outward flow; and a sterilizing unit disposed in fluid communication with the water, the sterilizing unit emitting energies tuned to disrupt cellular structures of micro-organisms.

28. The sterilizing water circulation apparatus as in claim 27, wherein the sterilizing unit is an ultrasonic energy generating device.

29. The sterilizing water circulation apparatus as in claim 28, wherein the ultrasonic energy generating device is mounted on an external surface of the sterilizing water circulation apparatus.

30. The sterilizing water circulation apparatus as in claim 27, wherein the sterilizing unit is an ionizing energy generating device.

31. The sterilizing water circulation apparatus as in claim 30, wherein the ionizing energy generating device is mounted on an internal surface of the sterilizing water circulation apparatus in fluid communication with an internal fluid flow generated by the motor-driven means.

32. A hydraulic dam generating apparatus comprising:

an upper float chassis with a wider lower base thereof being equipped with an annular water outflow lip at essentially the surface level of the water;

a sectional diverter for water being arranged in a lower portion of the upper float chassis, the sectional diverter facilitating a generally horizontal laminar outward flow through a spacing between the outflow lip and the upper end of the sectional diverter, along the surface of the water in which the hydraulic dam generating apparatus floats;

motor-driven means being mounted on the upper float chassis for drawing water into a lower open end of a circulator device effectuating a flow of the water towards the spacing;

an inlet tube disposed at the lower open end of the circulator device, the inlet tube being configured for drawing water from within 2 feet of the surface level of the water on an upstream side; and a deflecting member for directing the outward flow of the water towards a generally downstream direction.

33. The hydraulic dam generating apparatus as in claim 32, wherein the directed outward flow of water generates a downwelling water layer for inhibiting downstream flow of subsurface water.

34. The hydraulic dam generating apparatus as in claim 32, wherein a plurality of hydraulic dam generating apparatus is disposed in a line across a section of a fluid path of the water and orthogonal to the direction of a flow of the water.

35. A surface circulating apparatus comprising:

an upper float chassis with a wider lower base thereof being equipped with an annular water outflow lip at essentially the surface level of the water;

a sectional diverter for water being arranged in a lower portion of the upper float chassis, the sectional diverter facilitating a generally horizontal laminar outward flow through a spacing between the outflow lip and the upper end of the sectional diverter, along the surface of the water;

motor-driven means being mounted on the upper float chassis for drawing water into a lower open end of a circulator device effectuating a flow of the water towards the spacing; and an inlet tube disposed at the lower open end of the circulator device, the inlet tube being configured for drawing water from within 2 feet of the surface level of the water.

36. The surface circulating apparatus as in claim 35, wherein the inlet tube is formed with a single inlet opening.

37. The surface circulating apparatus as in claim 36, wherein the inlet tube has a generally J-shape.

38. The surface circulating apparatus as in claim 35, wherein the inlet tube is formed with a two inlet openings, each inlet opening is situated at opposite sides of the surface circulating apparatus.

39. The surface circulating apparatus as in claim 38, wherein the inlet tube has a generally double J-shape.

40. A wave generating system comprising:

a fluid circulating apparatus including:

an upper float chassis with a wider lower base thereof being equipped with an annular water outflow lip at essentially the surface level of the water, a sectional diverter for water being arranged in a lower portion of the upper float chassis, the sectional diverter facilitating a generally horizontal laminar outward flow through a spacing between the outflow lip and the upper end of the sectional diverter, along the surface of the water, and motor-driven means being mounted on the upper float chassis for drawing water into a lower open end of the fluid circulating apparatus effectuating a flow of the water towards the spacing; and a recessed portion situated at a bottom of a shallow pond, the recessed portion dimensioned to accommodate the fluid circulating apparatus at a top end of the recessed portion and limiting movement of the fluid circulating apparatus to a vertical direction, the recessed portion including:

an inflow section running underneath a bottom surface of the shallow pond for drawing water from the shallow pond into the recessed portion.

41. The wave generating system as in claim 40, wherein the inflow section directs the drawn water into the recessed portion at a tangential angle for inducing a centrifugal flow around the inside perimeter of the recessed portion.

42. The wave generating system as in claim 40, wherein the recessed portion further comprises an outlet pipe for expelling solid matter condensed at a bottom surface of the recessed portion by the centrifugal flow.

43. The wave generating system as in claim 42, wherein the recessed portion further comprises an ultrasonic horn for emitting ultrasonic energy directed at the solid matter and tuned to a frequency adapted for disrupting the solid matter.

44. A water aerating apparatus comprising:

an upper float chassis with a wider lower base thereof being equipped with an annular water outflow lip at essentially the surface level of the water;

a sectional diverter for water being arranged in a lower portion of the upper float chassis, the sectional diverter facilitating a generally horizontal laminar outward flow through a spacing between the outflow lip and the upper end of the sectional diverter, along the surface of the water;

motor-driven means being mounted on the upper float chassis for drawing water into a lower open end of a circulator device effectuating a flow of the water towards the spacing;

air injection means having a venturi assembly for injecting air into the water to generate fine microbubbles in the outward flow; and an inlet tube disposed at the lower open end of the circulator device, the inlet tube being configured for drawing in water.

45. The water aerating apparatus as in claim 44, wherein the inlet tube is formed with a single inlet opening.

46. The water aerating apparatus as in claim 44, wherein the inlet tube has a generally J-shape.

47. The water aerating apparatus as in claim 44, wherein the inlet tube is formed with a two inlet openings, each inlet opening is situated at opposite sides of the surface circulating apparatus.

48. The water aerating apparatus as in claim 47, wherein the inlet tube has a generally double J-shape.

49. The water aerating apparatus as in claim 44 in which the fluid motor-driven means is coupled to a screw.

* * * * *